US010070062B2

(12) United States Patent
Chung et al.

(10) Patent No.: US 10,070,062 B2
(45) Date of Patent: Sep. 4, 2018

(54) CAMERA AND ELECTRONIC DEVICE INCLUDING THE SAME

(71) Applicant: Samsung Electronics Co., Ltd., Gyeonggi-do (KR)

(72) Inventors: Hae In Chung, Gyeonggi-do (KR); Jin Won Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/598,911

(22) Filed: May 18, 2017

(65) Prior Publication Data

US 2017/0339346 A1   Nov. 23, 2017

(30) Foreign Application Priority Data

May 18, 2016 (KR) .................. 10-2016-0060827

(51) Int. Cl.
| *G03B 5/00*  | (2006.01) |
| *H04N 5/232* | (2006.01) |
| *G02B 27/64* | (2006.01) |
| *G03B 29/00* | (2006.01) |
| *B23Q 1/62*  | (2006.01) |

(52) U.S. Cl.
CPC ....... *H04N 5/23267* (2013.01); *G02B 27/646* (2013.01); *G03B 29/00* (2013.01); *H04N 5/23254* (2013.01); *H04N 5/23287* (2013.01); *B23Q 1/62* (2013.01); *G03B 5/00* (2013.01); *G03B 2205/0007* (2013.01); *G03B 2205/0015* (2013.01); *H04N 5/23248* (2013.01)

(58) Field of Classification Search
CPC ...................................... G03B 5/00
USPC .......................................... 396/55
See application file for complete search history.

(56) References Cited

U.S. PATENT DOCUMENTS

| 664       | A  | * | 4/1838  | Savery ............... B21G 3/12 |
|           |    |   |         | 470/131                         |
| 7,345,833 | B2 |   | 3/2008  | Hwang                           |
| 7,664,388 | B2 |   | 2/2010  | Huang                           |
| 7,786,648 | B2 |   | 8/2010  | Xu et al.                       |
| 7,812,507 | B2 |   | 10/2010 | Takahashi et al.                |

(Continued)

FOREIGN PATENT DOCUMENTS

| JP | 2009044856 |   | 2/2009 |              |
|----|------------|---|--------|--------------|
| JP | 2009-142121| * | 6/2009 | ...... H02N 2/00 |
| JP | 2009142121 | * | 6/2009 | ...... H02N 2/00 |

*Primary Examiner* — Clayton E Laballe
*Assistant Examiner* — Kevin Butler
(74) *Attorney, Agent, or Firm* — The Farrell Law Firm, P.C.

(57) ABSTRACT

An electronic device is provided which includes a housing, a display, a camera, a memory, and a processor. The camera includes a lens barrel, a first rotary member including a first rotary shaft and a first contact part, a second rotary member including a second rotary shaft and a second contact part, a frame, and a control circuit. The first rotary member rotates about the first rotary shaft in a first direction by driving a first actuator, one end of which is coupled to the first rotary shaft and an opposite end of which contacts the first contact part, and the second rotary member rotates about the second rotary shaft in a second direction that is substantially perpendicular to the first direction by driving a second actuator, one end of which is coupled to the second rotary shaft and an opposite end of which contacts the second contact part.

14 Claims, 18 Drawing Sheets

(56) References Cited

U.S. PATENT DOCUMENTS

| | | |
|---|---|---|
| 8,279,541 B2 | 10/2012 | Henderson et al. |
| 9,124,793 B2 | 9/2015 | Sheu |
| 2006/0261248 A1* | 11/2006 | Hwang ............... H04M 1/0264 250/208.1 |
| 2008/0031614 A1* | 2/2008 | Huang ................... G02B 7/023 396/428 |
| 2009/0039734 A1* | 2/2009 | Takahashi ............ H02N 2/0025 310/323.02 |
| 2010/0038996 A1* | 2/2010 | Xu ....................... H02N 2/0015 310/323.16 |
| 2011/0058099 A1* | 3/2011 | Lai ....................... H04N 5/2251 348/373 |
| 2011/0109968 A1* | 5/2011 | Park ....................... G03B 17/00 359/554 |
| 2011/0141584 A1* | 6/2011 | Henderson ............. G02B 7/022 359/811 |
| 2015/0005031 A1* | 1/2015 | Sheu .................... H04N 5/2259 455/556.1 |

\* cited by examiner

CAMERA AND ELECTRONIC DEVICE INCLUDING THE SAME

PRIORITY

This application claims priority under 35 U.S.C. § 119(a) to Korean Patent Application Serial No. 10-2016-0060827, which was filed on May 18, 2016, in the Korean Intellectual Property Office, the entire content of which is incorporated herein by reference.

BACKGROUND

1. Field of the Disclosure

The present disclosure generally relates to an electronic device, and more particularly, to an electronic device including a camera.

2. Description of the Related Art

In recent years, electronic devices, such as digital cameras, digital camcorders, or smartphones, including a camera have been widely distributed. An electronic device including a camera may provide a photographing function. The electronic device may output a preview image acquired by the camera on a display, and may acquire a captured image from the camera while a shutter is operated.

The electronic device may provide a function for correcting shaking of the camera due to the shaking of hands holding the camera during a photographing operation. The function for correcting shaking of the camera may include a method of translating or rotating a camera lens. The method of translating and rotating the camera lens may be forming an image of a subject at a normal location on an image forming surface by changing a path of light input through the lens.

In the conventional electronic device, a rotary member (e.g., a lens barrel) and an actuator for rotating (or translating) the rotary member may be supported by a separately provided support member. In this case, an assembly tolerance may occur between the rotary member and the actuator. Accordingly, a more precise assembly process is required to allow a contact part of the rotary member and a driving part of the actuator to continuously contact each other, and driving transmission efficiency may be lowered due to the assembly tolerance.

The conventional electronic device may further include a preliminary pressure applying part (e.g., an elastic member) to allow the contact part of the rotary member and the driving part of the actuator to continuously contact each other. However, as one end of the preliminary pressure applying part is connected to a separate support member and an opposite end of the preliminary pressure applying part is disposed to press an upper end of the driving part of the actuator, a pressing direction of the preliminary pressure applying part may not be perpendicular to a surface on which the driving part of the actuator and the contact part of the rotary member contact each other. Accordingly, the actuator may not transmit a force in a direction that is perpendicular to the contact surface of the rotary member and as a result, the driving transmission efficiency may be lowered.

SUMMARY

Aspects of the present disclosure are to address at least the above-mentioned problems and/or disadvantages and to provide at least the advantages described below. Accordingly, an aspect of the present disclosure is to provide a camera including an actuator connected to a rotary shaft of a rotary member and continuously contacting a contact surface of the rotary member in a direction that is perpendicular to the contact surface, and an electronic device including the same.

In accordance with an aspect of the present disclosure, an electronic device includes a housing including a first surface facing a first direction, a second surface facing a second direction that is opposite to the first direction, and a side surface surrounding at least a portion of a space formed between the first surface and the second surface, a display, a camera, a memory, and a processor functionally connected to the display, the camera, and the memory. The camera includes a lens barrel configured to fix and support at least one imaging element, a first rotary member configured to fix and support the lens barrel and including a first rotary shaft and a first contact part, a second rotary member configured to support the first rotary member and including a second rotary shaft and a second contact part, a frame configured to support the second rotary member, and a control circuit configured to control the camera. The first rotary member rotates about the first rotary shaft in a third direction by driving a first actuator, one end of the first actuator is coupled to the first rotary shaft and an opposite end of the first actuator contacts the first contact part, and the second rotary member rotates about the second rotary shaft in a fourth direction that is substantially perpendicular to the third direction by driving a second actuator, one end of the second actuator is coupled to the second rotary shaft and an opposite end of the second actuator contacts the second contact part.

In accordance with another aspect of the present disclosure, a camera includes a lens barrel configured to fix and support at least one imaging element, a first rotary member configured to fix and support the lens barrel and including a first rotary shaft and a first contact part, a second rotary member configured to support the first rotary member and including a second rotary shaft and a second contact part, a frame configured to support the second rotary member, a first actuator, one end of the first actuator is coupled to the first rotary shaft and an opposite end of the first actuator contacts the first contact part, a second actuator, one end of the second actuator is coupled to the second rotary shaft and an opposite end of the second actuator contacts the second contact part, and a control circuit configured to control the camera. The first actuator rotates the first rotary member about the first rotary shaft in a first direction by applying an external force in a tangential direction of the first contact part, and the second actuator rotates the second rotary member about the second rotary shaft in a second direction that is substantially perpendicular to the first direction by applying an external force in a tangential direction of the second contact part.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
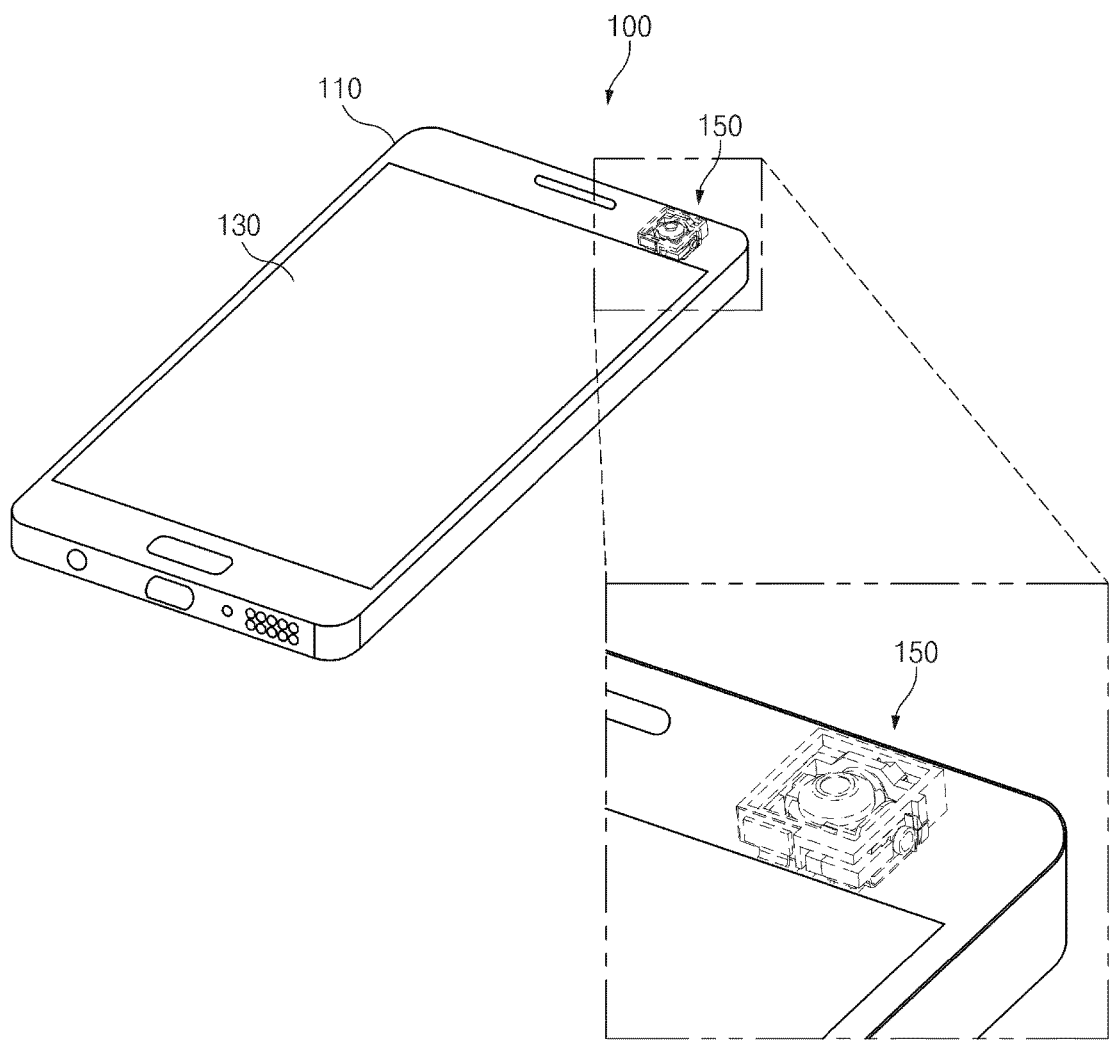
FIG. 1 is a perspective view of an electronic device including a camera according to an embodiment of the present disclosure.

Hereinafter, various embodiments of the present disclosure are disclosed with reference to the accompanying drawings. However, the present disclosure is not limited to a specific embodiment and it is intended that the present disclosure covers all modifications, equivalents, and/or alternatives of the present disclosure provided they are within the scope of the appended claims and their equivalents. With respect to the descriptions of the accompanying drawings, like reference numerals refer to like elements.

The terms and words used in the following description and claims are not limited to their dictionary meanings, but are merely used to enable a clear and consistent understanding of the present disclosure. Accordingly, it should be apparent to those skilled in the art that the following description of certain embodiments of the present disclosure is provided for illustration purpose only and not for the purposes of limiting the present disclosure as defined by the appended claims and their equivalents.

It is to be understood that the singular forms "a," "an," and "the" include plural forms unless the context clearly dictates otherwise. Thus, for example, reference to "a component surface" includes reference to one or more of such surfaces.

The terms "include," "comprise," and "have", or "may include," or "may comprise" and "may have" as used herein indicate disclosed functions, operations, or existence of elements but do not exclude other functions, operations or elements.

The expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like, as used herein may refer to modifying different elements of certain embodiments of the present disclosure, but do not limit the elements. For instance, "a first user device" and "a second user device" may indicate different user devices regardless of order or importance. For example, a first component may be referred to as a second component and vice versa without departing from the scope and spirit of the present disclosure.

In an embodiment of the present disclosure, it is intended that when a component (for example, a first component) is referred to as being "operatively or communicatively coupled with/to" or "connected to" another component (for example, a second component), the component may be directly connected to the other component or connected through another component (for example, a third component). When a component (for example, a first component) is referred to as being "directly connected to" or "directly accessed by" another component (for example, a second component), another component (for example, a third component) does not exist between the component (for example, the first component) and the other component (for example, the second component).

The expression "configured to" as used in an embodiment of the present disclosure, may be interchangeably used with the expressions "suitable for," "having the capacity to," "designed to," "adapted to," "made to," or "capable of" according to the situation. The expression "configured to" may not necessarily indicate "specifically designed to" in terms of hardware. Instead, the expression "a device configured to" in some situations may indicate that the device and another device or part are "capable of" The expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used the present disclosure are used to describe certain embodiments of the present disclosure, but do not limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device, according to an embodiment of the present disclosure, may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a motion picture experts group (MPEG-1 or MPEG-2) audio layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile or clothing integrated type device (e.g., an electronic apparel), a body attached type device (e.g., a skin pad or a tattoo), or a bio-implantable-type device (e.g., an implantable circuit)

In an embodiment of the present disclosure, an electronic device may be a smart home appliance. The smart home appliance may include at least one of, for example, a television (TV), a digital video/versatile disc (DVD) player, an audio player, a refrigerator, an air conditioner, a cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ or PlayStation™), an electronic dictionary, an electronic key, a camcorder, or an electronic picture frame In an embodiment of the present disclosure, an electronic device may include at least one of various medical devices (e.g., various portable medical measurement devices (e.g., a blood glucose measuring device, a heart rate measuring device, a blood pressure measuring device, a body temperature measuring device, and the like), a magnetic resonance angiography (MRA), a magnetic resonance imaging (MRI), a computed tomography (CT), an ultrasonic device, and the like), a navigation device, a global navigation satellite system (GNSS), an event data recorder (EDR), a flight data recorder (FDR), a vehicle infotainment device, electronic equipment for vessels (e.g., a navigation system, a gyrocompass, and the like), avionics, a security device, a head unit for a vehicle, an industrial or home robot, an automatic teller machine (ATM), a point of sales (POS) terminal, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, and the like).

According to an embodiment of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, and the like). An electronic device may be one or more combinations of the above-mentioned devices. An electronic device may be a flexible device. An electronic device is not limited to the above-mentioned devices, and may include new electronic devices with the development of new technology.

Hereinafter, an electronic device according to an embodiment of the present disclosure will be described in more detail with reference to the accompanying drawings. The term "user" as used herein may refer to a person who uses an electronic device or may refer to a device (e.g., an artificial intelligence electronic device) that uses an electronic device.

FIG. 1 is a perspective view of an electronic device including a camera according to an embodiment of the present disclosure.

Referring to FIG. 1, according to an embodiment of the present disclosure, an electronic device 100 including a camera 150 may support a photographing function. The electronic device 100 may output a preview image acquired by the camera 150 on a display 130, and when a photographing function button is selected, the image captured by the camera 150 may be stored in a memory. The electronic device 100 may support a function for correcting shaking of the camera 150, which may occur during a photographing operation of the camera 150. The electronic device 100 changes a light path, along which light is input through a lens of the camera 150, by rotating (or translating) the lens, and accordingly, may capture an image of a subject formed at a normal location on an image forming surface.

Referring to FIG. 1, the electronic device 100 for supporting the above-mentioned function includes a housing 110, a display 130, and a camera 150. The housing 110 may include a front surface, a rear surface, and a side surface partially surrounding a space between the front surface and the rear surface. The housing 110 may define an external appearance of the electronic device 100, and may fix and support internal components (e.g., the display 130 and the camera 150) of the electronic device 100. The housing 110 may include at least one hole such that at least one of the internal components may be exposed to the outside of the electronic device 100. The housing 110 may include a hole arranged at a location at which the camera 150 is seated so that light may be input to the camera 150.

The display 130, for example, may include a liquid crystal display (LCD), a light emitting diode (LED) display, an organic light emitting diode (OLED) display, a microelectromechanical system (MEMS) display, or an electronic paper display. The display 130 may display various content (e.g., a text, an image, a video, an icon, and a symbol). According to an embodiment of the present disclosure, the display 130 may output an image captured by the camera 150. The display 130 may output an image stored in an internal memory included in the camera 150 or an image stored in a memory of the electronic device 100. The display 130 may include a touch screen, and may receive a touch, a gesture, a proximity, or a hovering input using an electronic pen or the user's body.

The display 130 may be seated within the housing 110. Further, a cover layer (e.g., a front cover) may be arranged on the display 130. The cover layer may be coupled to one surface of the housing 110 to cover the display 130. The cover layer may define a portion of an external appearance (e.g., an external appearance of a front surface) of the electronic device 100. According to an embodiment of the present disclosure, at least an area of the cover layer may be formed of a transparent material (e.g., glass), and the display 130 may be displayed to the outside through the transparent area of the cover layer.

The camera 150 may capture a still image or a video. According to an embodiment of the present disclosure, the camera 150 may include an imaging element. The imaging element, for example, may include at least one of a lens configured to receive image light of a subject to form an image, an aperture configured to adjust an amount of light passing through the lens, a shutter configured to open and close the aperture such that an image sensor may be exposed for a specific period of time by light passing through the lens, an image sensor configured to receive the image formed in the lens as an optical signal, and an internal memory. The internal memory may store the captured image. The internal memory may store the image captured by the image sensor before the shutter is manipulated.

Some components of the camera 150 may be rotated (or translated). According to an embodiment of the present disclosure, the lens included in the camera 150 may be rotated. A lens barrel fixing and supporting the imaging components (e.g., the lens, the aperture, the shutter, the image sensor, or the internal memory) may be rotated. A configuration of the camera 150, which rotates the lens, will be described in the present disclosure.

The configuration of the electronic device 100 is not limited to the embodiments of the present disclosure. At least one of the components of the electronic device 100 may be further included in addition to the above-mentioned components. The electronic device 100 may further include at least one of a processor, a memory, an input/output interface, and a communication interface.

The processor may include one or more of a central processing unit (CPU), an application processor (AP), or a communication processor (CP). The processor, for example, may execute operations or data processing related to the control and/or communication of at least one other component of the electronic device 100. The processor may control a plurality of hardware or software components by driving an operating system or an application program and perform a variety of data processing and calculations. The processor may be implemented by, for example, a system on chip (SoC). According to an embodiment of the present disclosure, the processor may further include a graphical processing unit (GPU) and/or an image signal processor.

The processor may be electrically connected to the lens, the aperture, the image sensor, and the shutter included in the camera 150 to control functions related to the camera 150. The processor, for example, may control functions, such as automatic focusing, automatic exposure, custom white balance, zoom in, zoom out, photographing, continuous photographing, timer photographing, flash on/off, or filtering. As another example, the processor may store the captured image in the internal memory or the memory, and may output the captured image on the display 130. The processor may provide the image stored in the internal memory as a preview or a live view. The processor may store an image captured by manipulating the shutter in the internal memory, and may store the image in the memory when a specific user input is made or according to set information.

The memory may include a volatile and/or nonvolatile memory. The memory may store a command or data related to at least one other component of the electronic device 100. According to an embodiment of the present disclosure, the memory may store software and/or a program. The memory may store an application (e.g., a camera application) supporting a photographing function by using the camera 150. The memory may store an image captured by the camera 150. The memory may include an embedded memory or an external memory.

The input/output interface, for example, may deliver commands or data input from the user or another external device to another component(s) of the electronic device 100, or may output commands or data received from another component(s) of the electronic device 100 to the user or another external device.

The communication interface, for example, may set communication between the electronic device 100 and an external device. The communication interface may be connected to a network through wireless or wired communication to communicate with the external device.

Figure 2:
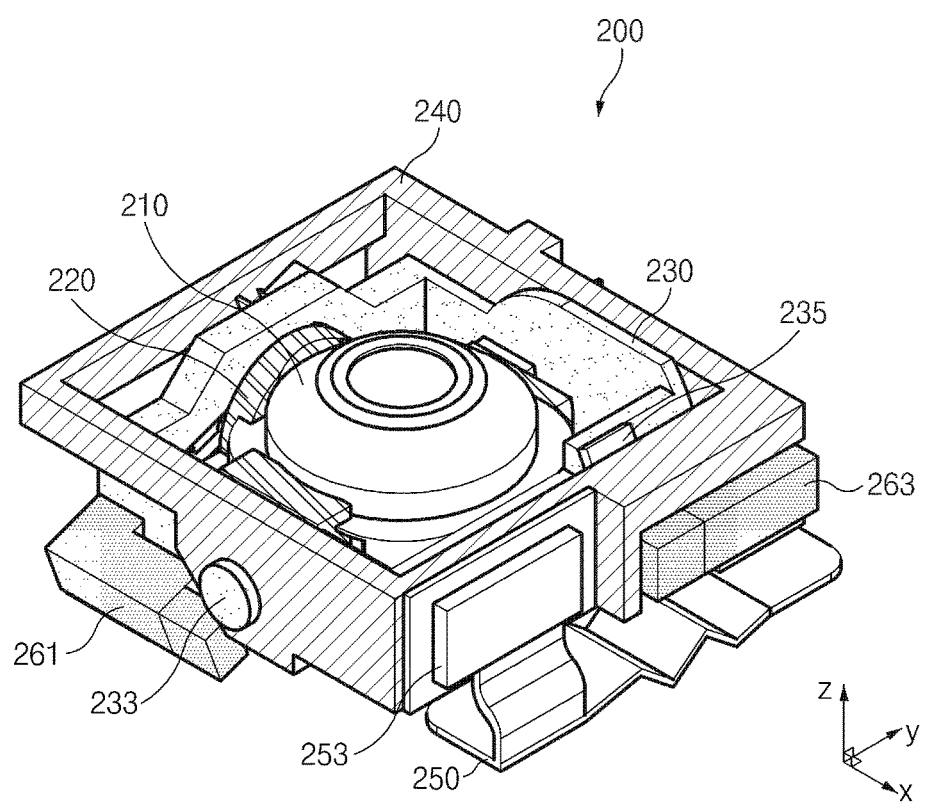
FIG. 2 is a perspective view of a camera according to an embodiment of the present disclosure.
Figure 3:
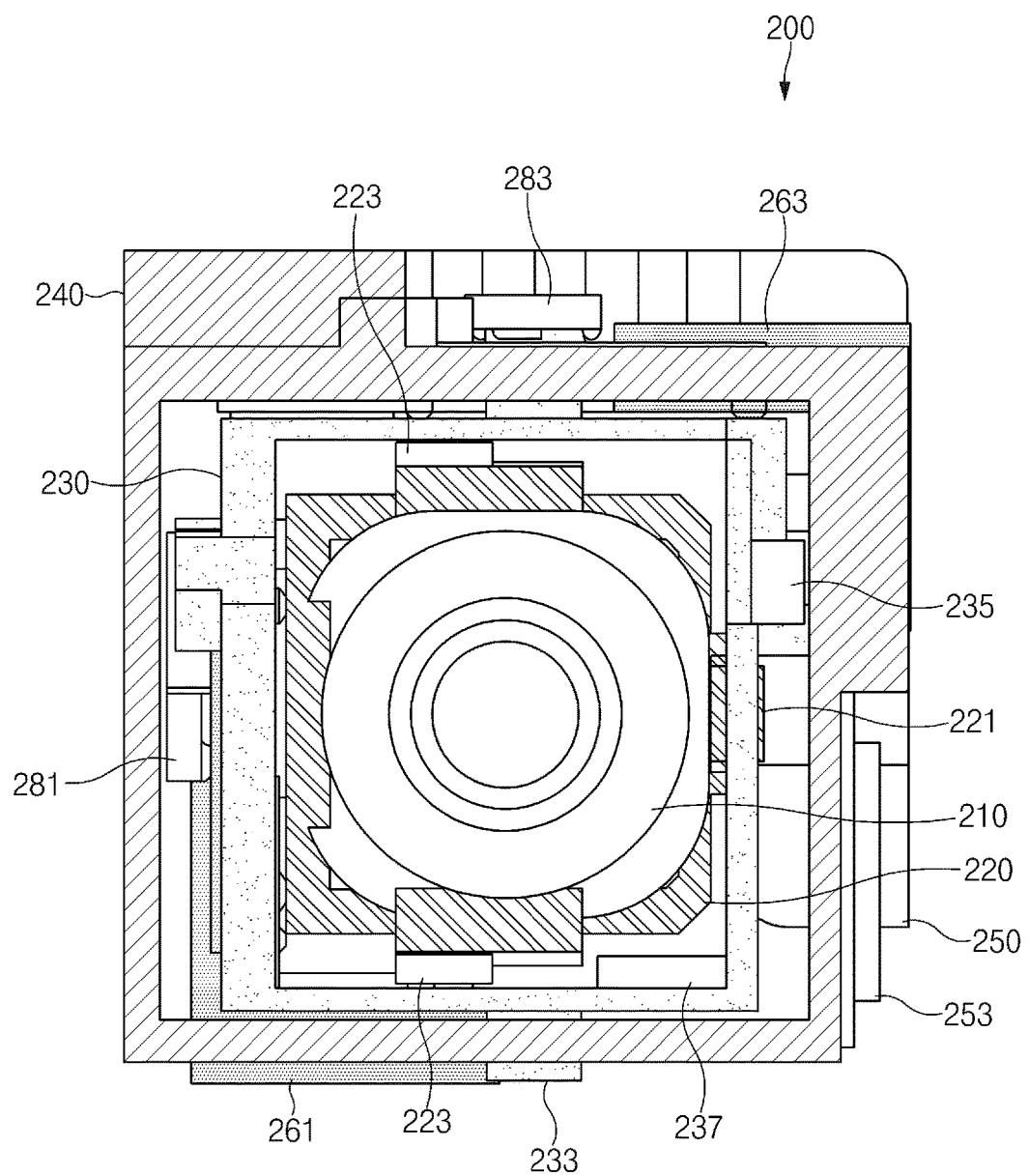
FIG. 3 is a plan view of a camera according to an embodiment of the present disclosure.
Figure 4:
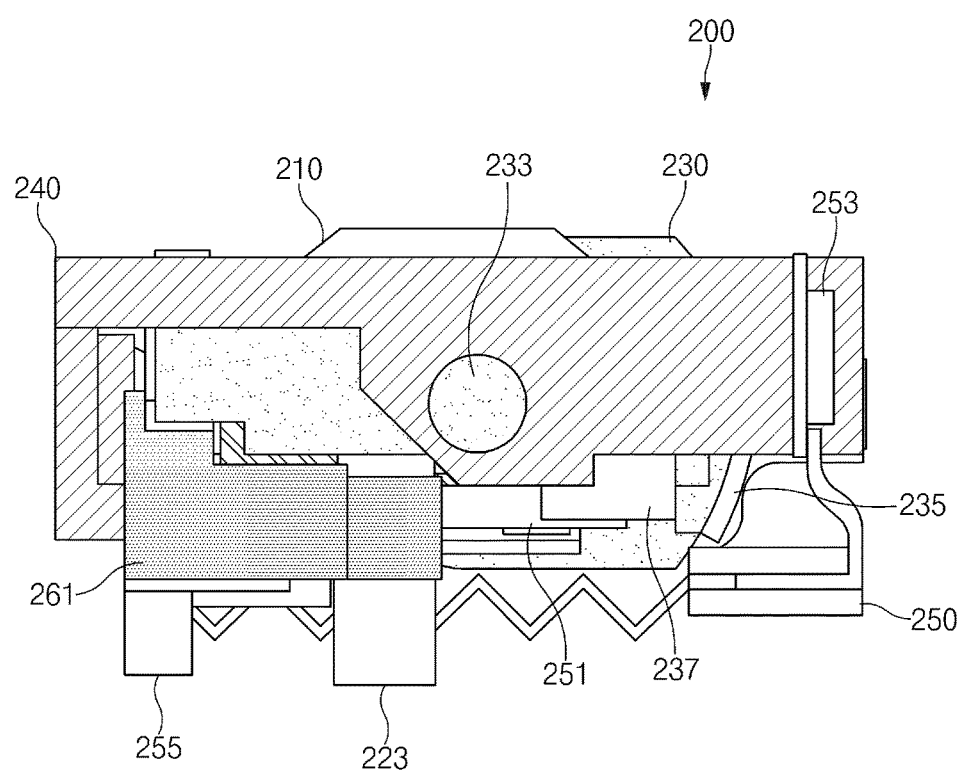
FIG. 4 is a front view of a camera according to an embodiment of the present disclosure.
Figure 5:
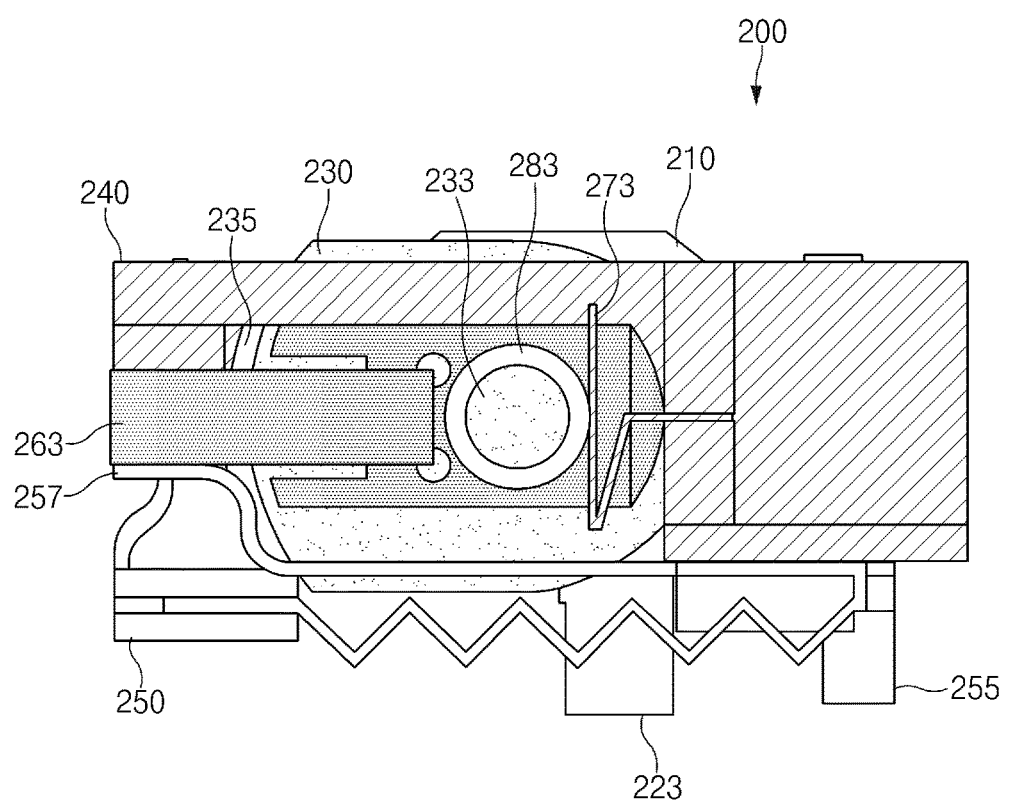
FIG. 5 is a rear view of a camera according to an embodiment of the present disclosure.
Figure 6:
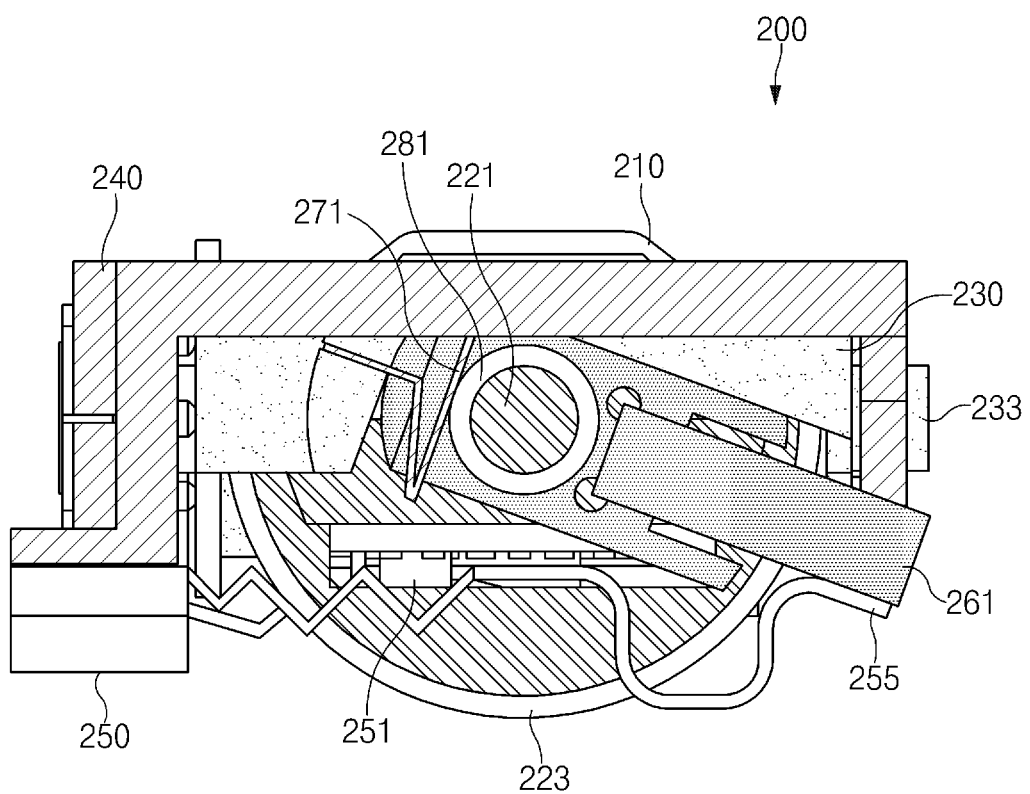
FIG. 6 is a left side view of a camera according to an embodiment of the present disclosure.
Figure 7:
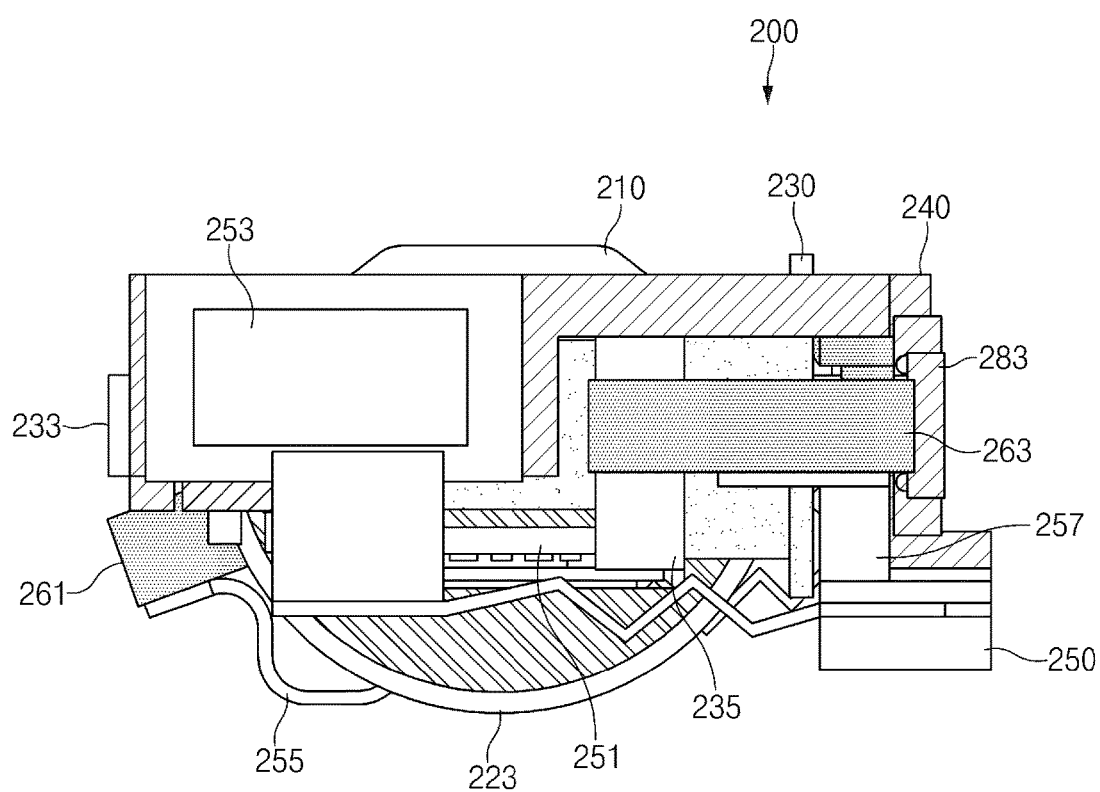
FIG. 7 is a right side view of a camera according to an embodiment of the present disclosure.
Figure 8:
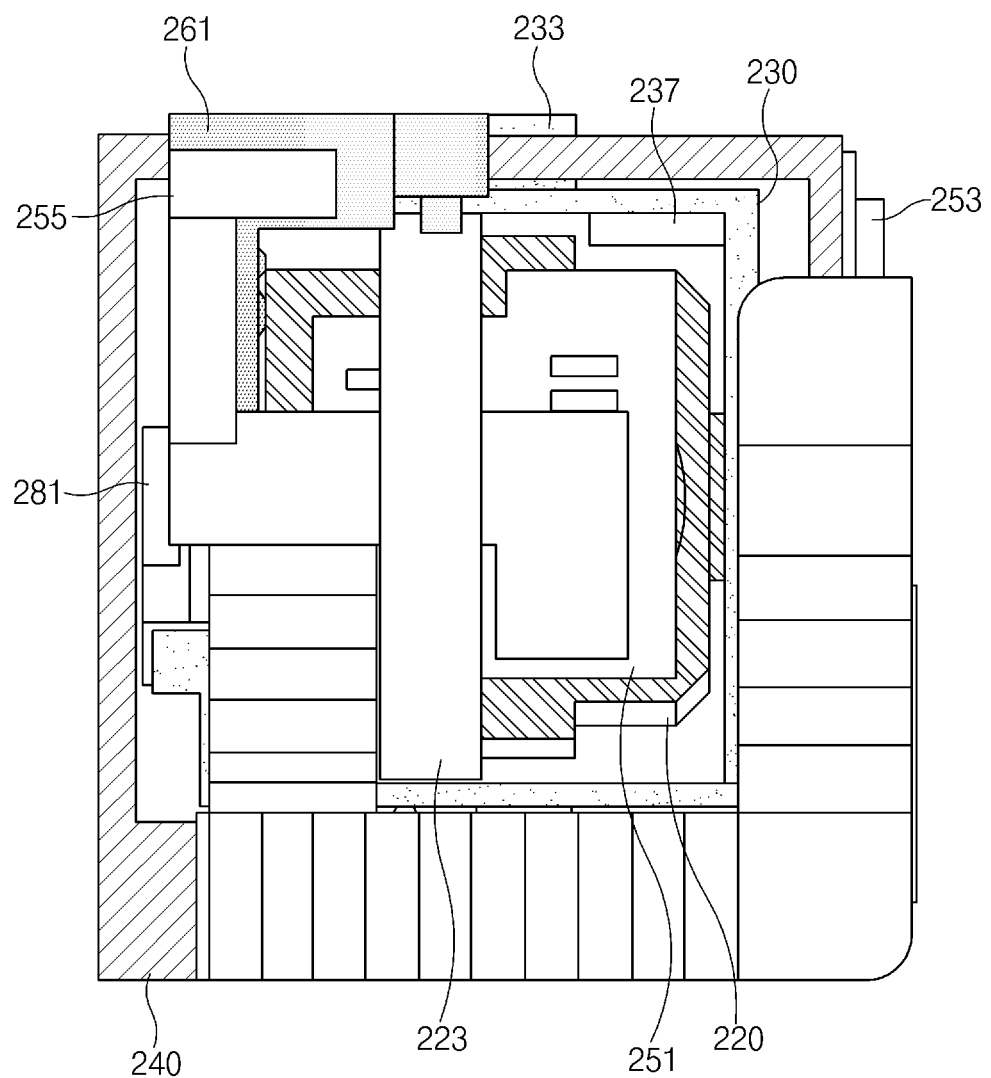
FIG. 8 is a bottom view of a camera according to an embodiment of the present disclosure.
Figure 9:
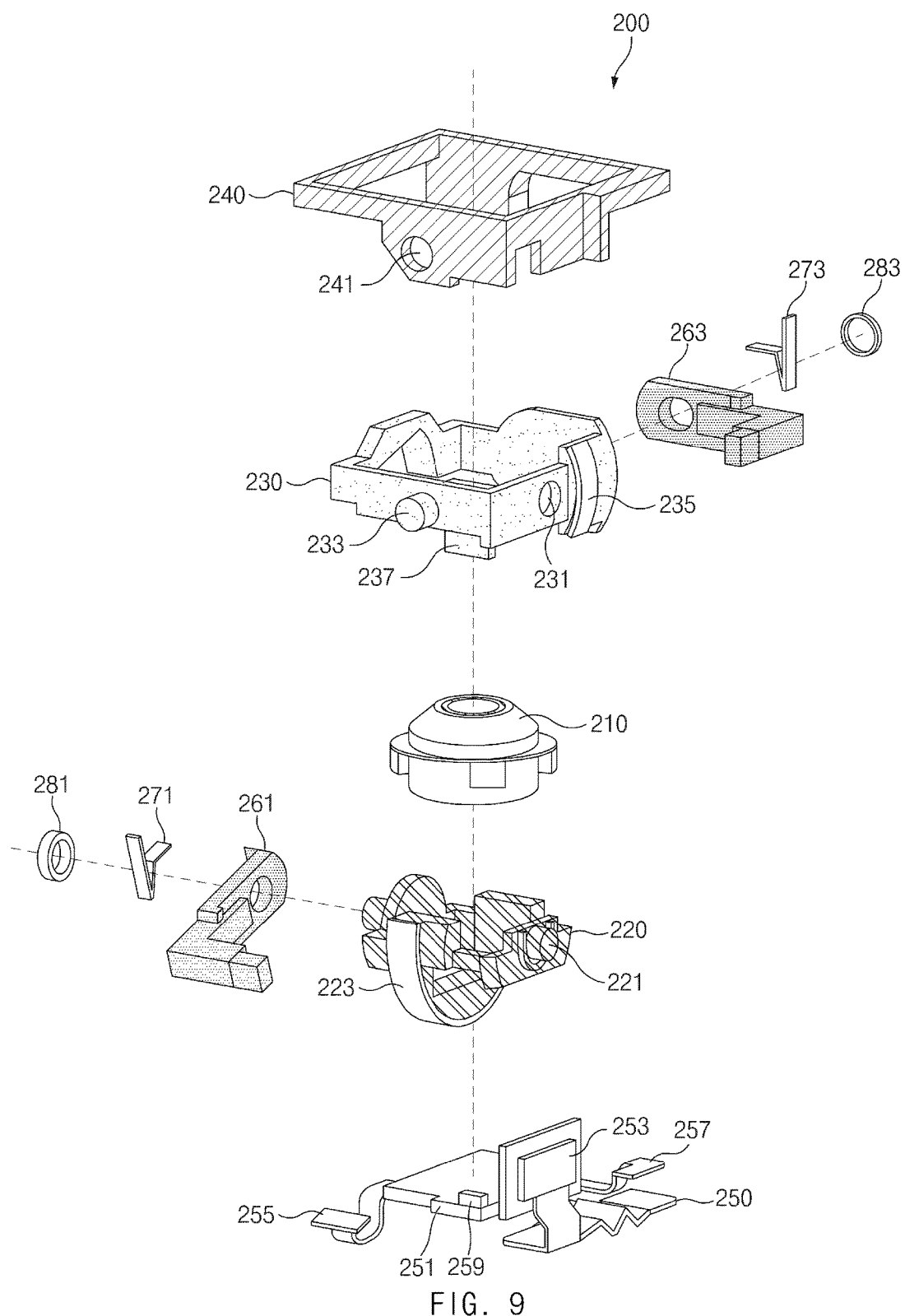
FIG. 9 is an exploded perspective view of a camera according to an embodiment of the present disclosure.

FIG. 2 is a perspective view of a camera according to an embodiment of the present disclosure. FIG. 3 is a plan view of a camera according to an embodiment of the present disclosure. FIG. 4 is a front view of a camera according to an embodiment of the present disclosure. FIG. 5 is a rear view of a camera according to an embodiment of the present disclosure. FIG. 6 is a left side view of a camera according to an embodiment of the present disclosure. FIG. 7 is a right side view of a camera according to an embodiment of the present disclosure. FIG. 8 is a bottom view of a camera according to an embodiment of the present disclosure. FIG. 9 is an exploded perspective view of a camera according to an embodiment of the present disclosure.

Referring to FIGS. 2 to 9, a camera 200 includes a lens barrel 210, a first rotary member 220, a second rotary member 230, a frame 240, and a circuit unit 250. However, the configuration of the camera 200 is not limited thereto. According to an embodiment of the present disclosure, at least one of the above-mentioned components may be omitted from the camera 200 or at least one additional element may be further included in the camera 200.

The lens barrel 210 may fix and support at least one lens. According to an embodiment of the present disclosure, the lens barrel 210 has a recess, and at least one lens may be inserted into and disposed in the recess. When a plurality of lenses are disposed, the lenses may be stacked in multiple stages. According to an embodiment of the present disclosure, the at least one lens inserted into the recess of the lens barrel 210 may be fixed to the lens barrel 210 by at least one of a fixing member (e.g., a pressing ring) and a bonding member.

The lens barrel 210 may include at least one imaging element. For example, an aperture and the like may be additionally inserted into and disposed in the recess of the lens barrel 210. Further, a cover may be coupled to an upper side of the recess such that foreign substances are not introduced into the recess of the lens barrel 210. At least a partial area of the cover may be formed of a transparent material (e.g., glass), and light may be introduced through the transparent area of the cover. A shutter, an image sensor, or an internal memory may be further disposed in the lens barrel 210.

The first rotary member 220 may fix and support the lens barrel 210. The first rotary member 220 may have a recess such that the lens barrel 210 may be inserted into and fixed to the first rotary member 220. According to an embodiment of the present disclosure, a screw thread or a screw groove may be formed on an outer peripheral surface of the lens barrel 210, and a screw groove or a screw thread may be formed on an inner peripheral surface of the recess formed in the first rotary member 220 to correspond to the screw thread or the screw groove formed on the outer peripheral surface of the lens barrel 210. Accordingly, the lens barrel 210 may be inserted into and coupled to the recess formed in the first rotary member 220 while being rotated. However, a method of coupling the lens barrel 210 to the first rotary member 220 is not limited thereto. The lens barrel 210 may be press-fitted with or fixed to the recess of the first rotary member 220, or may be fixed to the first rotary member 220 by using a screw member or a bonding member.

The first rotary member 220 may include a first rotary shaft 221 and a first contact part 223. The first rotary shaft 221 may protrude from a portion of an outer peripheral surface of the first rotary member 220 to the outside of the first rotary member 220. According to an embodiment of the present disclosure, two first rotary shafts 221 may protrude on the central axis of the first rotary member 220 to face opposite directions. For example, one of the first rotary shafts 221 may protrude from a first part (e.g., a portion of a left surface) of the outer peripheral surface of the first rotary member 220 in a first direction (e.g., a leftward direction), and the other of the first rotary shafts 221 may protrude from a second part (e.g., a portion of a right surface) of the outer peripheral surface of the first rotary member 220 in a second direction (e.g., a rightward direction) that is opposite to the first direction. In this case, the first part and the second part are located on the central axis of the first rotary member 220, and may be located at opposite locations of the outer peripheral surface of the first rotary member 220.

The first contact part 223 may be formed at a portion of an outer peripheral surface of the first rotary member 220. At least a portion of the outer peripheral surface of the first rotary member 220 may be curved, and the first contact part 223 may be formed in at least a portion of the curve. For example, a portion of a bottom surface of the first rotary member 220 may be curved, and the first contact part 223 may be formed at a portion of the curved bottom surface. According to an embodiment of the present disclosure, the first contact part 223 may have a band shape.

The first rotary member 220 may be rotated about the first rotary shaft 221. The first rotary member 220 may be rotated by driving a first actuator 261. The first actuator 261 may be coupled to the first rotary shaft 221 of the first rotary member 220, and a driving unit formed at one end of the first actuator 261 may contact the first contact part 223 of the first rotary member 220. The first actuator 261 may have an L shape, and one end of the first actuator 261 may be coupled to the first rotary shaft 221 and an opposite end of the first actuator 261 may contact the first contact part 223. A vibratory force may be generated by driving the first actuator 261, and accordingly, the first rotary member 220 may be rotated if the driving unit of the first actuator 261 is moved on the first contact part 223 of the first rotary member 220.

The first actuator 261 may not deviate from the first rotary member 220 due to a first constraint member 281. The first constraint member 281 may be coupled to the first rotary shaft 221 of the first rotary member 220 while the first actuator 261 is coupled to the first rotary shaft 221 of the first rotary member 220, in order to prevent the first actuator 261 from deviating from the first rotary shaft 221. The first constraint member 281 may have a hole such that the first constraint member 281 may be fitted with the first rotary shaft 221 of the first rotary member 220. The first constraint member 281 may be coupled to the first rotary member 220 as the first rotary shaft 221 is inserted into the hole.

The driving unit of the first actuator 261 may continuously contact the first contact part 223 of the first rotary member 220 due to a first preliminary pressure applying member 271. The first preliminary pressure applying member 271 may apply an external force to the first constraint member 281 in a lengthwise direction of the first actuator 261. If an external force is applied to the first constraint member 281, the first rotary member 220 is moved in the lengthwise direction of the first actuator 261 as a whole, and accordingly, the first contact part 223 of the first rotary member 220 may continuously contact the driving unit of the first actuator 261. One end of the first preliminary pressure applying member 271 may be fixed to the second rotary member 230. The first preliminary pressure applying member 271 may include an elastic body or a magnetic body. FIG. 6 illustrates an embodiment in which the first preliminary pressure applying member 271 is a leaf spring.

The form and type of the first preliminary pressure applying member 271, and a method of applying a preliminary pressure may be variously determined. The first preliminary pressure applying member 271 may apply an external force to the first actuator 261 and not to the first constraint member 281. For example, as an opposite end of the first preliminary pressure applying member 271 is connected to the first actuator 261 to pull the first actuator 261, the driving unit of the first actuator 261 may continuously contact the first contact part 223 of the first rotary member 220. The external force applied to the first constraint member 281 or the first actuator 261 due to the first preliminary pressure applying member 271 may be due to a magnetic force as well as an elastic force.

The second rotary member 230 may support the first rotary member 220. The second rotary member 230 has an opening therein, and the first rotary member 220 may be inserted into and seated in the opening. Further, a hole 231 may be formed on one side surface of the second rotary member 230, and as the first rotary shaft 221 of the first rotary member 220 is inserted into the hole 231, the second rotary member 230 may support the first rotary member 220. The diameter of the hole 231 of the second rotary member 230 may be larger than the outer diameter of the first rotary shaft 221 such that the first rotary member 220 may be smoothly rotated.

The second rotary member 230 may include a second rotary shaft 233 and a second contact part 235. The second rotary shaft 233 may protrude from a portion of an outer peripheral surface of the second rotary member 230 to the outside of the second rotary member 230. According to an embodiment of the present disclosure, two second rotary shafts 233 may protrude on the central axis of the second rotary member 230 to face opposite directions. For example, one of the second rotary shafts 233 may protrude from a first part (e.g., a portion of a front surface) of the outer peripheral surface of the second rotary member 230 in a first direction (e.g., a forward direction), and the other of the second rotary shafts 233 may protrude from a second part (e.g., a portion of a rear surface) of the outer peripheral surface of the second rotary member 230 in a second direction (e.g., a rearward direction) that is opposite to the first direction. In this case, the first part and the second part are located on the central axis of the second rotary member 230, and may be located at opposite locations of the outer peripheral surface of the second rotary member 230.

The second contact part 235 may be formed at a portion of an outer peripheral surface of the second rotary member 230. At least a portion of the outer peripheral surface of the second rotary member 230 may be curved, and the second contact part 235 may be formed in at least a portion of the curve. For example, a portion of a side surface of the second rotary member 230 may be curved, and the second contact part 235 may be formed at a portion of the curved side surface. According to an embodiment of the present disclosure, the second contact part 235 may have a band shape.

The second rotary member 230 may be rotated about the second rotary shaft 233. The second rotary member 230 may be rotated by driving a second actuator 263. The second actuator 263 may be coupled to the second rotary shaft 233 of the second rotary member 230, and a driving unit formed at one end of the second actuator 263 may contact the second contact part 235 of the second rotary member 230. Similar to the first actuator 261, the second actuator 263 may have an L shape. One end of the second actuator 263 may be coupled to the second rotary shaft 233, and an opposite end of the second actuator 263 may contact the second contact part 235. A vibratory force may be generated by driving the second actuator 263, and accordingly, the second rotary member 230 may be rotated if the driving unit of the second actuator 263 is moved on the second contact part 235 of the second rotary member 230.

The second actuator 263 may not deviate from the second rotary member 230 due to a second constraint member 283. The second constraint member 283 may be coupled to the second rotary shaft 233 of the second rotary member 230 while the second actuator 263 is coupled to the second rotary shaft 233 of the second rotary member 230, in order to prevent the second actuator 263 from deviating from the second rotary shaft 233. The second constraint member 283 may have a hole such that the second constraint member 283 may be fitted with the second rotary shaft 233 of the second rotary member 230. The second constraint member 283 may be coupled to the second rotary member 230 as the second rotary shaft 233 is inserted into the hole.

The driving unit of the second actuator 263 may continuously contact the second contact part 235 of the second rotary member 230 due to a second preliminary pressure applying member 273. The second preliminary pressure applying member 273 may have a shape that is the same as, or similar to, the first preliminary pressure applying member 271 and may be formed of a material that is the same as, or similar to, that of the first preliminary pressure applying member 271. The second preliminary pressure applying member 273 may apply an external force to the second constraint member 283 in a lengthwise direction of the second actuator 263. If an external force is applied to the second constraint member 283, the second rotary member 230 is moved in the lengthwise direction of the second actuator 263 as a whole, and accordingly, the second contact part 235 of the second rotary member 230 may continuously contact the driving unit of the second actuator 263. One end of the second preliminary pressure applying member 273 may be fixed to the frame 240.

According to an embodiment of the present disclosure, the second preliminary pressure applying member 273 may apply an external force to the second actuator 263 and not to the second constraint member 283. For example, as an opposite end of the second preliminary pressure applying member 273 is connected to the second actuator 263 to pull the second actuator 263, the driving unit of the second actuator 263 may continuously contact the second contact part 235 of the second rotary member 230. The external force applied to the second constraint member 283 or the second actuator 263 due to the second preliminary pressure applying member 273 may be due to a magnetic force as well as an elastic force.

The frame 240 may support the second rotary member 230. The frame 240 may have an opening therein, and the second rotary member 230 may be inserted into and seated in the opening. Further, a hole 241 may be formed on one side surface of the frame 240, and as the second rotary shaft 233 of the second rotary member 230 is inserted into the hole 241, the frame 240 may support the second rotary member 230. The diameter of the hole 241 of the frame 240 may be larger than the outer diameter of the second rotary shaft 233 such that the second rotary member 230 may be smoothly rotated.

Referring to FIG. 9, the circuit unit 250 may include a control circuit for controlling components included in the camera 200. The circuit unit 250 may be disposed at a lower end of the first rotary member 220, and may be electrically connected to the lens barrel 210, the first actuator 261, and the second actuator 263. The circuit unit 250 may include a printed circuit board 251, a driving chip 253, a first driving line 255, and a second driving line 257.

Various components for controlling the camera 200 may be mounted on the printed circuit board 251. According to an embodiment of the present disclosure, an image sensor, an image signal processor (ISP), an internal memory, and the like, may be mounted on the printed circuit board 251. Further, at least one sensor 259 may be mounted on the printed circuit board 251.

The sensor 259 may detect a rotation state of the lens barrel 210 and convert the detected rotation state into an electrical signal. The sensor 259 may detect rotation of the first rotary member 220 configured to fix and support the lens barrel 210 and rotation of the second rotary member 230 configured to support the first rotary member 220, and may convert the detected rotation state into an electrical signal. According to an embodiment of the present disclosure, the sensor 259 may include a Hall sensor. The Hall sensor may detect a rotation state of the lens barrel 210 by analyzing the intensity and direction of a magnetic force. When the sensor 259 includes a Hall sensor, a magnetic body 237 may be further disposed in the camera 200. The magnetic body 237 may be disposed on an inner peripheral surface of the second rotation member 230.

The driving chip 253 may control the driving of the first actuator 261 and the second actuator 263. The driving chip 253 may drive the first actuator 261 and the second actuator 263, based on the rotation state of the lens barrel 210 detected by the sensor 259. The driving chip 253 may be electrically connected to the first actuator 261 through the first driving line 255, and may be electrically connected to the second actuator 263 through the second driving line 257. At least one of the first driving line 255 and the second driving line 257 may be embodied by a flexible printed circuit board.

According to an embodiment of the present disclosure, the first rotary member 220 may be rotated by driving the first actuator 261, and the second rotary member 230 may be rotated by driving the second actuator 263. The first rotary member 220 may be rotated in a forward and rearward direction (e.g., the y axis direction) of the camera 200, and the second rotary member 230 may be rotated in a rightward and leftward direction (e.g., the x axis direction) of the camera 200. However, the present disclosure is not limited thereto. The rotational directions of the first rotary member 220 and the second rotary member 230 may be reversed, or may not be the forward and rearward direction or the leftward and rightward direction of the camera 200. However, it is preferable that the rotational directions of the first rotary member 220 and the second rotary member 230 be perpendicular to each other.

Figure 10:
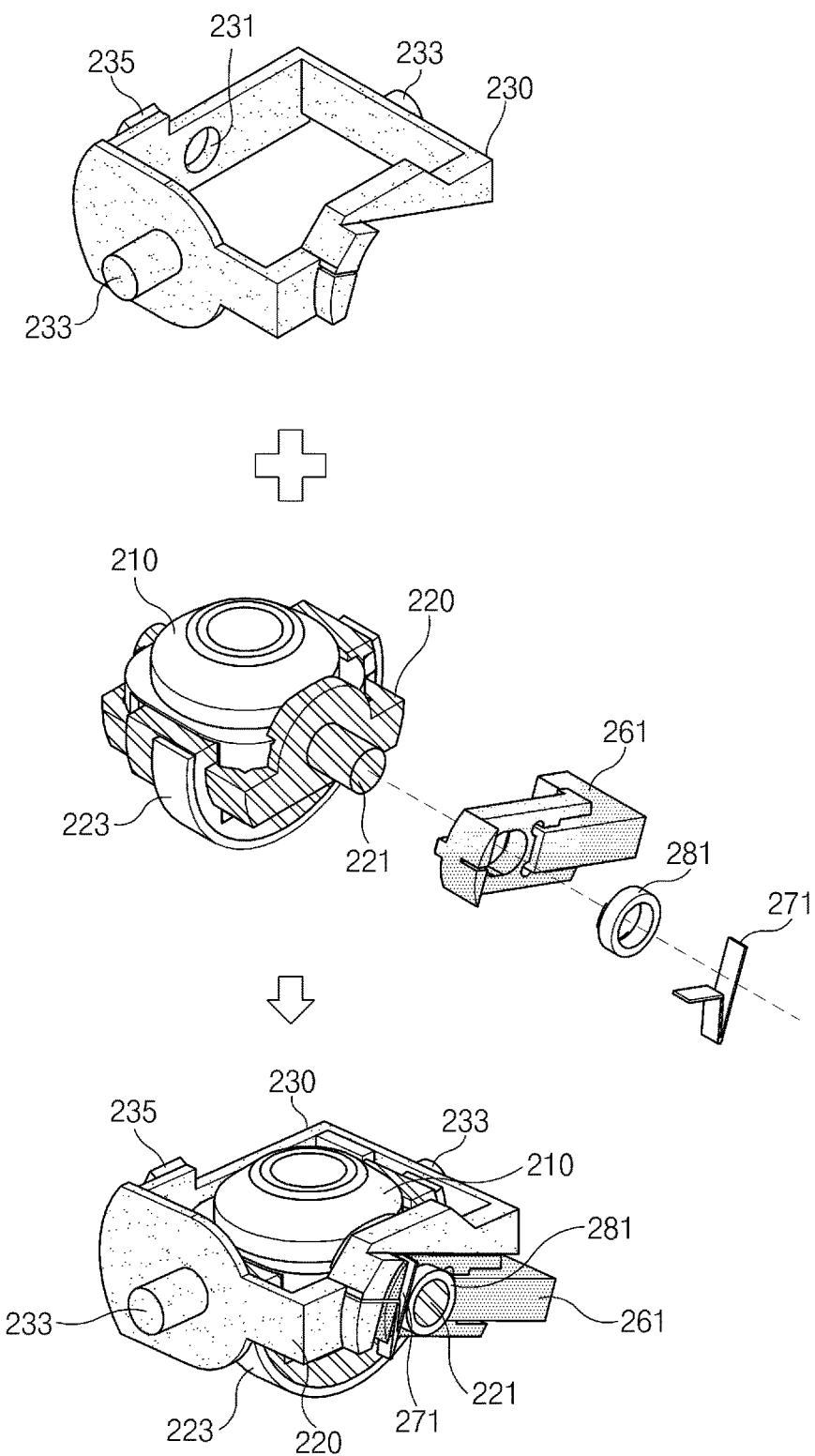
FIG. 10 illustrates a method of coupling a first rotary member and a first actuator according to an embodiment of the present disclosure.

FIG. 10 illustrates a method of coupling a first rotary member and a first actuator according to an embodiment of the present disclosure.

Referring to FIG. 10, the first rotary member 220, to which the lens barrel 210 is fixed, includes the first rotary shaft 221 and the first contact part 223. The first actuator 261 may be coupled to the first rotary shaft 221, and the first constraint member 281 may be coupled to the first rotary shaft 221, to which the first actuator 261 is coupled. The first constraint member 281 may be attached and coupled to a side surface of the first actuator 261, and may prevent the first actuator 261 from deviating from the first rotary shaft 221.

The first rotary member 220 may be coupled to the second rotary member 230. The first rotary shaft 221 of the first rotary member 220 may be inserted into the hole 231 formed on one side surface of the second rotary member 230.

The first preliminary pressure applying member 271 may apply an external force to the first constraint member 281 such that the driving unit of the first actuator 261 may continuously contact the first contact part 223 of the first rotary member 220. One end of the first preliminary pressure applying member 271 may be fixed to the second rotary member 230, and an opposite end of the first preliminary pressure applying member 271 may contact the first constraint member 281 such that the first constraint member 281 is pushed in the lengthwise direction of the first actuator 261. According to an embodiment of the present disclosure, a slit may be formed on one surface of the second rotary member 230 such that one end of the first preliminary pressure applying member 271 may be inserted into and fixed to the side surface of the second rotary member 230. However, the form in which the first preliminary pressure applying member 271 is fixed is not limited thereto. The first preliminary pressure applying member 271 may be fixed to one side surface of the second rotary member 230 by a bonding member.

Figure 11:
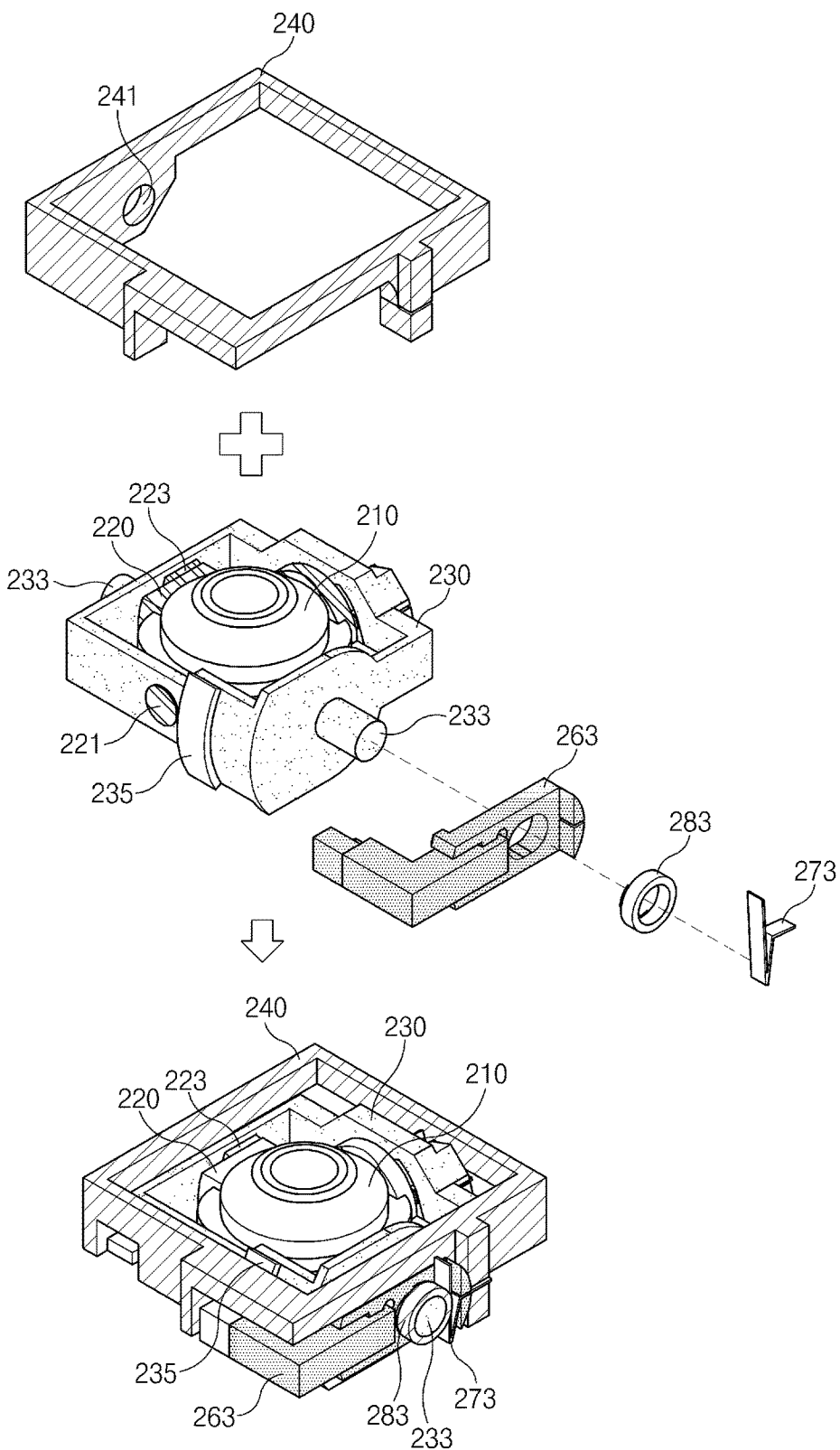
FIG. 11 illustrates a method of coupling a second rotary member and a second actuator according to an embodiment of the present disclosure.

FIG. 11 illustrates a method of coupling a second rotary member and a second actuator according to an embodiment of the present disclosure.

Referring to FIG. 11, the second rotary member 230, to which the first rotary member 220 is coupled, includes the second rotary shaft 233 and the second contact part 235. The second actuator 263 may be coupled to the second rotary shaft 233, and the second constraint member 283 may be coupled to the second rotary shaft 233, to which the second actuator 263 is coupled. The second constraint member 283 may be attached and coupled to a side surface of the second actuator 263, and may prevent the second actuator 263 from deviating from the second rotary shaft 233.

The second rotary member 230 may be coupled to the frame 240. The second rotary shaft 233 of the second rotary member 230 may be inserted into the hole 241 formed on one side surface of the frame 240.

The second preliminary pressure applying member 273 may apply an external force to the second constraint member 283 such that the driving unit of the second actuator 263 may continuously contact the second contact part 235 of the second rotary member 230. One end of the second preliminary pressure applying member 273 may be fixed to the frame 240, and an opposite end of the second preliminary pressure applying member 273 may contact the second constraint member 283 such that the second constraint member 283 is pushed in the lengthwise direction of the second actuator 263. According to an embodiment of the present disclosure, a slit may be formed on one surface of the frame 240 such that one end of the second preliminary pressure applying member 273 may be inserted into and fixed to the side surface of the frame 240. However, the form in which the second preliminary pressure applying member 273 is fixed is not limited thereto. The second preliminary pressure applying member 273 may be fixed to one side surface of the frame 240 by a bonding member.

Figure 12:
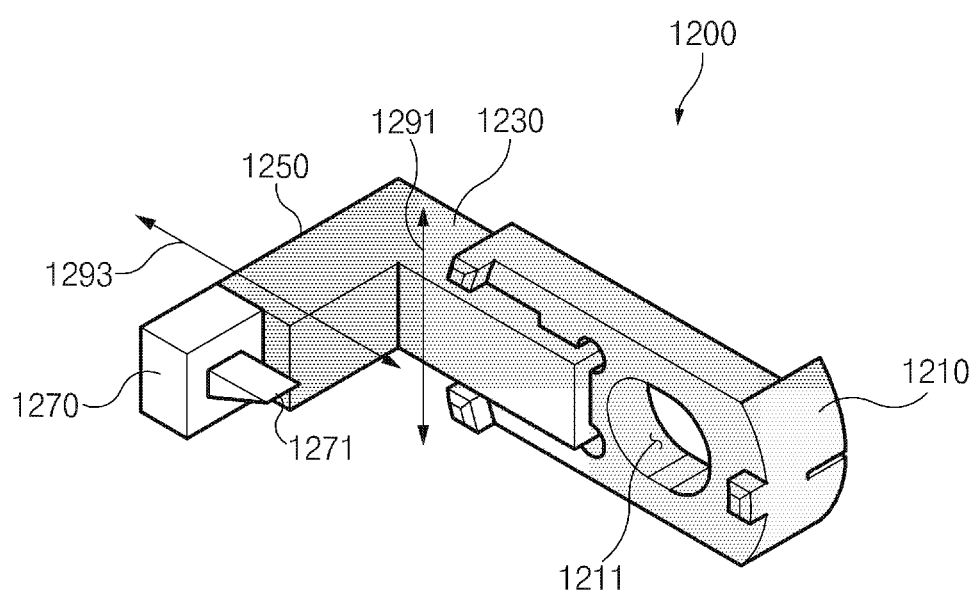
FIG. 12 is a perspective view of an actuator according to an embodiment of the present disclosure.

FIG. 12 is a perspective view of an actuator according to an embodiment of the present disclosure.

The actuator 1200 illustrated in FIG. 12 may have a configuration that is the same as, or similar to, those of the first actuator 261 and the second actuator 263. According to an embodiment of the present disclosure, the actuator 1200 may include a piezoelectric transducer (PZT) actuator. The actuator 1200, for example, may move a driven body (e.g., a rotary body) by using characteristics of a piezoelectric material in which the piezoelectric material is contracted or expanded if a voltage is applied to the piezoelectric material.

Referring to FIG. 12, the actuator 1200 includes a coupling part 1210, a first vibratory part 1230, a second vibratory part 1250, and a tip end part 1270. The coupling part 1210 may be coupled to the driven body (e.g., the first rotary member 220 or the second rotary member 230). The coupling part 1210 may have a through-hole 1211. The through-hole 1211 may be formed in a central area of the coupling part 1210. According to an embodiment of the present disclosure, a rotary shaft of the driven body may be inserted into and coupled to the through-hole 1211. For example, as the first rotary shaft 221 of the first rotary member 220 is inserted into the through-hole 1211, the actuator 1200 may be coupled to the first rotary member 220. Further, as the second rotary shaft 233 of the second rotary member 230 is inserted into the through-hole 1211, the actuator 1220 may be coupled to the second rotary member 230.

The first vibratory part 1230 may be connected to the coupling part 1210, and may have a specific length in a lengthwise direction of the actuator 1200. The first vibratory part 1230 may vibrate in a longitudinal direction (e.g., a direction of a first arrow 1291) of the actuator 1200.

The second vibratory part 1250 may extend from the first vibratory part 1230 in a widthwise direction of the actuator 1200 by a specific length. The second vibratory part 1250 and the first vibratory part 1230 may be connected to each other in directions that are perpendicular to each other. The second vibratory part 1250 may vibrate in a lengthwise direction (e.g., a direction of a second arrow 1293) of the actuator 1200.

The tip end part 1270 may be connected to the second vibratory part 1250, and may be formed at a tip end of the actuator 1200. The tip end part 1270 may include a driving part 1271 protruding in towards the coupling part 1210 of the actuator 1200 by a specific length. According to an embodiment of the present disclosure, the driving part 1271 may protrude from one surface of the tip end part 1270 towards the coupling part 1210 by a specific length. The driving part 1271 may have a triangular prism shape.

According to an embodiment of the present disclosure, the driving part 1271 may rotate the driven body in contact with the driving part 1271 through vibration of the first vibratory part 1230 and the second vibratory part 1250. The driving part 1271 may apply a rotational force to the driven body while being moved in a longitudinal direction (e.g., a direction of the first arrow 1291) of the actuator 1200 through vibration of the first vibratory part 1230. The driving part 1271 may be moved on a contact part of the driven body, and may apply an external force in a tangential direction of the contact part. The driving part 1271 may move in a lengthwise direction (e.g., a direction of the second arrow 1293) of the actuator 1200 through vibration of the second vibratory part 1250 to contact the driven body at a specific period. Accordingly, the driving part 1271 may rotate the driven body about a rotary shaft of the driven body.

Figure 13:
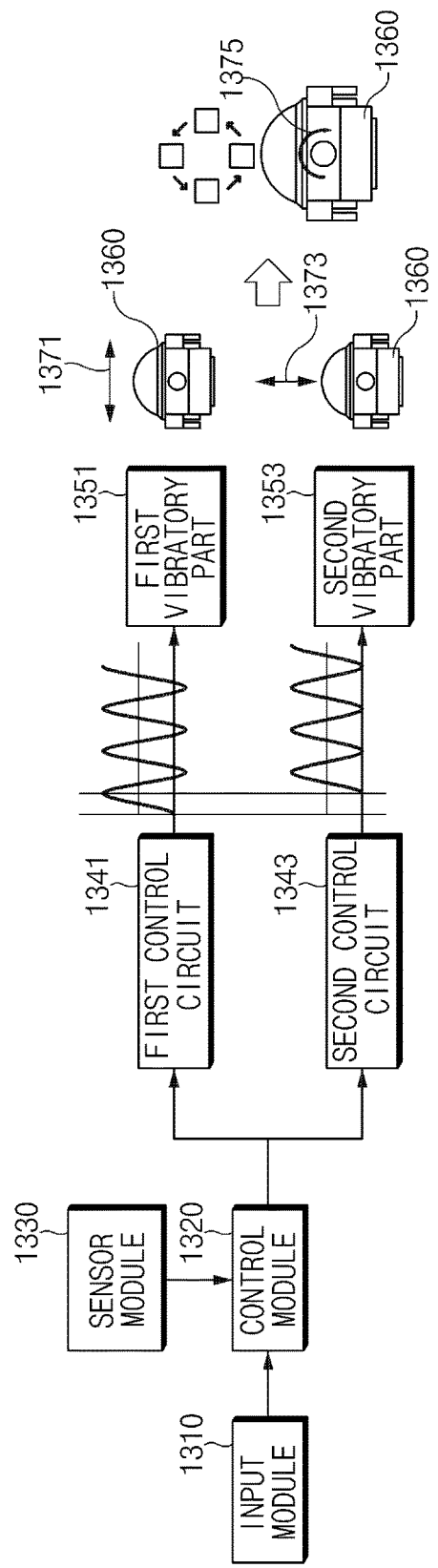
FIG. 13 illustrates a method of driving an actuator according to an embodiment of the present disclosure.

FIG. 13 illustrates a method of driving an actuator according to an embodiment of the present disclosure.

Referring to FIG. 13, the rotary body 1360 may rotate by driving the actuator 1200). The actuator may be coupled to the rotary shaft of the rotary body 1360 to share the center of rotation, and may apply an external force in a tangential direction of the contact part formed at a portion of an outer peripheral surface of the rotary body 1360 to the contact part. The actuator may continuously contact the contact part of the rotary body 1360 due to the preliminary pressure applying member.

According to an embodiment of the present disclosure, a control module 1320 may acquire an input related to rotation of the rotary body 1360 through an input module 1310. The input module 1310 may measure an angle and a distance between a lens included in the rotary body 1360 and a subject and may deliver the angle and the distance to the control module 1320. The control module 1320 may acquire a rotational state of the rotary body 1360 through a sensor module 1330. The sensor module 1330 may detect a rotational state of the rotary body 1360, and may deliver the detected rotational state information to the control module 1320.

The control module 1320 may drive the actuator by using the input acquired through the input module 1310 and the rotational state of the rotary body 1360 acquired through the sensor module 1330. The control module 1320 may drive a first vibratory part 1351 of the actuator through a first control circuit 1341 and may drive a second vibratory part 1353 of the actuator through a second control circuit 1343.

According to an embodiment of the present disclosure, the control module 1320 may apply signals having a phase difference of 90 degrees to the first vibratory part 1351 and the second vibratory part 1353. The actuator may apply an external force in a tangential direction of the contact part of the rotary body 1360 to the contact part due to vibration 1371 of the first vibratory part 1351, and the actuator may contact the rotary body 1360 at a specific period due to the vibration 1373 of the second vibratory part 1353. Accordingly, the actuator may rotate the rotary body 1360 about the rotary shaft of the rotary body 1360 in the direction of the arrow 1375.

Figure 14:
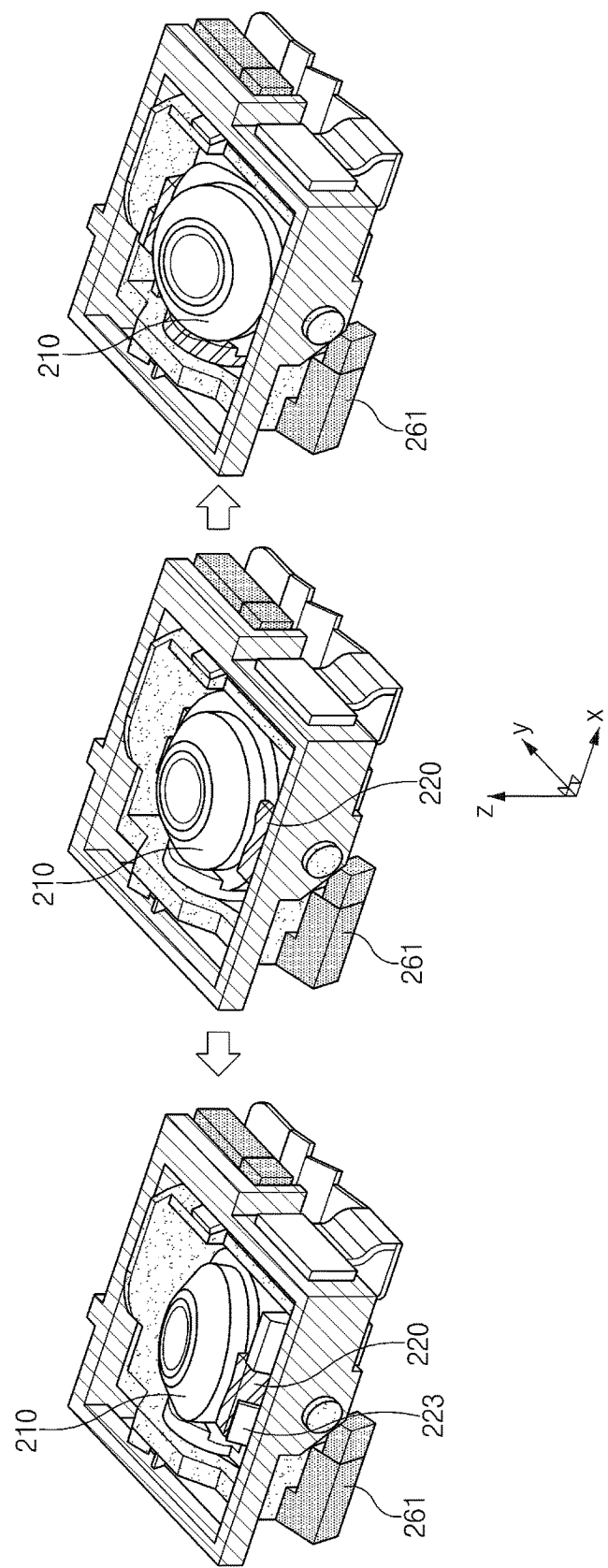
FIG. 14 illustrates a method of rotation of a first rotary member by driving a first actuator according to an embodiment of the present disclosure.

FIG. 14 illustrates a method of rotation of a first rotary member by driving a first actuator according to an embodiment of the present disclosure.

Referring to FIG. 14, one end (e.g., the coupling part 1210) of the first actuator 261 may be coupled to the rotary shaft 221 of the first rotary member 220, and an opposite end (e.g., the driving part 1271) of the first actuator 261 may contact the contact part 223 of the first rotary member 220. The vibratory parts of the first actuator 261 may be connected to each other to be perpendicular to each other, and may vibrate in different directions. For example, the first vibratory part 1230 of the first actuator 261 connected to the coupling part and having a specific length in a lengthwise direction (e.g., the y axis direction) of the first actuator 261 may vibrate in a longitudinal direction (e.g., the z axis direction) of the first actuator 261. Further, the second vibratory part 1250 of the first actuator 261 extending from the first vibratory part by a specific length in a widthwise direction (e.g., the x axis direction) of the first actuator 261 may vibrate in a lengthwise direction (e.g., the y axis direction) of the first actuator 261. Accordingly, the first actuator 261 may rotate the first rotary member 220 in a lengthwise direction (e.g., the y axis direction) of the first actuator 261.

Figure 15:
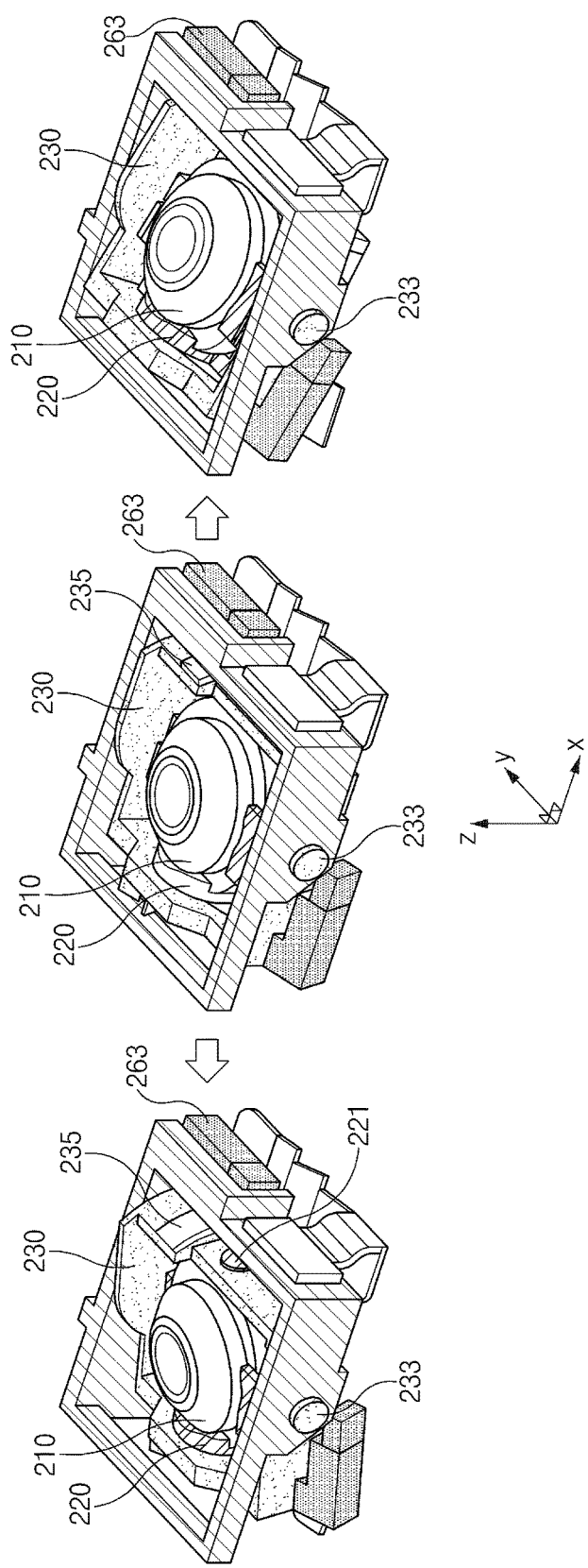
FIG. 15 illustrates a method of rotation of a second rotary member by driving a second actuator according to an embodiment of the present disclosure.

FIG. 15 illustrates a method of rotation of a second rotary member by driving a second actuator according to an embodiment of the present disclosure.

Referring to FIG. 15, one end (e.g., the coupling part 1210) of the second actuator 263 may be coupled to the rotary shaft 233 of the second rotary member 230, and an opposite end (e.g., the driving part 1271) of the second actuator 263 may contact the contact part 235 of the second rotary member 230. The vibratory parts of the second actuator 263 may be connected to each other to be perpendicular to each other, and may vibrate in different directions. For example, the first vibratory part 1230 of the second actuator 263 connected to the coupling part and having a specific length in a lengthwise direction (e.g., the x axis direction) of the second actuator 263 may vibrate in a longitudinal direction (e.g., the z axis direction) of the second actuator 263. Further, the second vibratory part 1250 of the second actuator 263 extending from the first vibratory part by a specific length in a widthwise direction (e.g., the y axis direction) of the second actuator 263 may vibrate in a lengthwise direction (e.g., the x axis direction) of the second actuator 263. Accordingly, the second actuator 263 may rotate the second rotary member 230 in a lengthwise direction (e.g., the x axis direction) of the second actuator 263.

Figure 16:
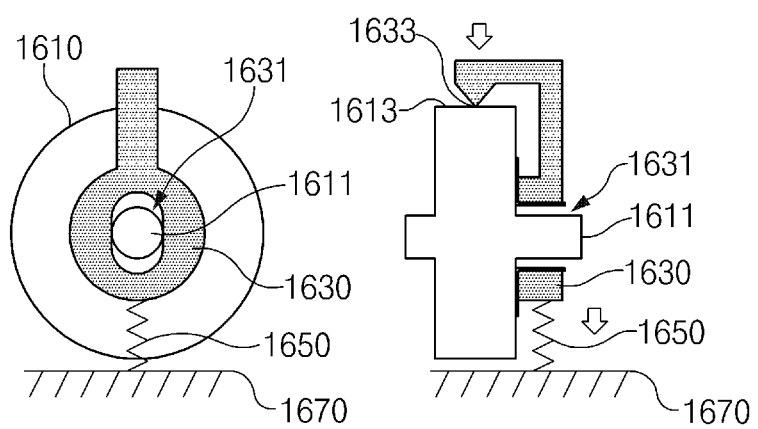
FIG. 16 illustrates a method of allowing a rotary member and an actuator to continuously contact each other according to an embodiment of the present disclosure.

FIG. 16 illustrates a method of allowing a rotary member and an actuator to continuously contact each other according to an embodiment of the present disclosure.

Referring to FIG. 16, an actuator 1630 coupled to a rotary shaft 1611 of a rotary body 1610 may rotate the rotary body 1610. In order to allow the actuator 1630 to rotate the rotary body 1610, it is necessary for a driving part 1633 of the actuator 1630 to continuously contact a contact part 1613 of the rotary body 1610.

A preliminary pressure applying member 1650 may be used to force the driving part 1633 of the actuator 1630 to continuously contact the contact part 1613 of the rotary body 1610. The preliminary pressure applying member 1650 may force the driving part 1633 of the actuator 1630 to continuously contact the contact part 1613 of the rotary body 1610 by applying an external force to the actuator 1630. According to an embodiment of the present disclosure, while one end of the preliminary pressure applying member 1650 is fixed to a fixing member 1670, an opposite end of the preliminary pressure applying member 1650 may be connected to the actuator 1630 to pull the actuator 1630. Accordingly, the driving part 1633 of the actuator 1630 may be moved towards the fixing member 1670 by a pulling force (e.g., an attractive force) of the preliminary pressure applying member 1650 to continuously contact the contact part 1613 of the rotary body 1610. In this case, the rotary shaft 1611 of the rotary body 1610 inserted into a through-hole 1631 of the actuator 1630 may be moved to and attached to an upper end of the through-hole 1631.

Although FIG. 16 illustrates a state in which the preliminary pressure applying member 1650 is an elastic body, the present disclosure is not limited thereto. The preliminary pressure applying member 1650 may be a magnetic body. When the preliminary pressure applying member 1650 is a magnetic body, each of the actuator 1630 and the fixing member 1670 may include the preliminary pressure applying member 1650.

Figure 17:
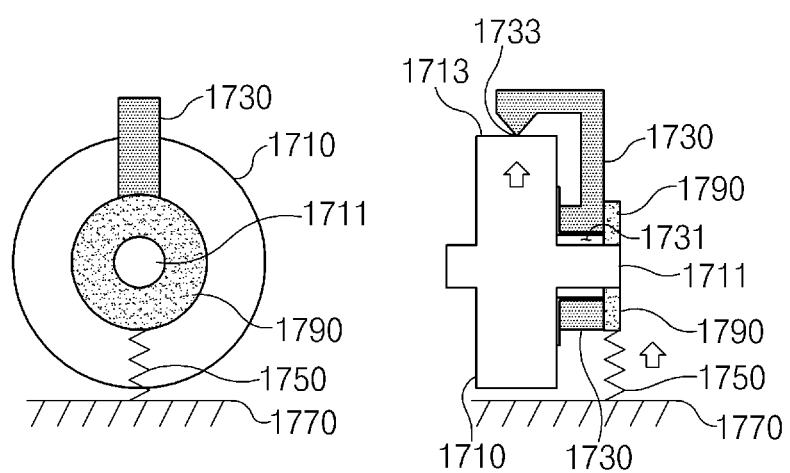
FIG. 17 illustrates another method of allowing a rotary member and an actuator to continuously contact each other according to an embodiment of the present disclosure.

FIG. 17 illustrates another method of allowing a rotary member and an actuator to continuously contact each other according to an embodiment of the present disclosure.

Referring to FIG. 17, an actuator 1730 coupled to a rotary shaft 1711 of a rotary body 1710 may rotate a rotary body 1710. In order to allow the actuator 1730 to rotate the rotary body 1710, it is necessary for a driving part 1733 of the actuator 1730 to continuously contact a contact part 1713 of the rotary body 1710. Further, a constraint member 1790 may be used to prevent the actuator 1730 from deviating from the rotary shaft 1711 of the rotary body 1710. While the actuator 1730 is coupled to the rotary shaft 1711, the constraint member 1790 may be coupled to the rotary shaft 1711 outside the actuator 1730.

A preliminary pressure applying member 1750 may be used to force the driving part 1733 of the actuator 1730 to continuously contact the contact part 1713 of the rotary body 1710. The preliminary pressure applying member 1750 may force the driving part 1733 of the actuator 1730 to continuously contact the contact part 1713 of the rotary body 1710 by applying an external force to the constraint member 1790 as illustrated in FIG. 17 instead of directly applying an external force to the actuator 1730 as illustrated in FIG. 16.

According to an embodiment of the present disclosure, while one end of the preliminary pressure applying member 1750 is fixed to a fixing member 1770, an opposite end of the preliminary pressure applying member 1750 may be connected to the constraint member 1790 to push the constraint member 1790. Due to a pushing force (e.g., a repelling force) of the preliminary pressure applying member 1750, the rotary shaft 1711 of the rotary body 1710 may be pushed in a direction that is opposite to the fixing member 1790, together with the constraint member 1790. Accordingly, the contact part 1713 of the rotary body 1710 may continuously contact the driving part 1733 of the actuator 1730. In this case, the rotary shaft 1711 of the rotary body 1710 inserted into a through-hole 1731 of the actuator 1730 may be moved to and attached to an upper end of the through-hole 1731.

Although FIG. 17 illustrates a state in which the preliminary pressure applying member 1750 is an elastic body, the present disclosure is not limited thereto. The preliminary pressure applying member 1750 may be a magnetic body. When the preliminary pressure applying member 1750 is a magnetic body, each of the fixing member 1770 and the constraint member 1790 may include the preliminary pressure applying member 1750.

Figure 18:
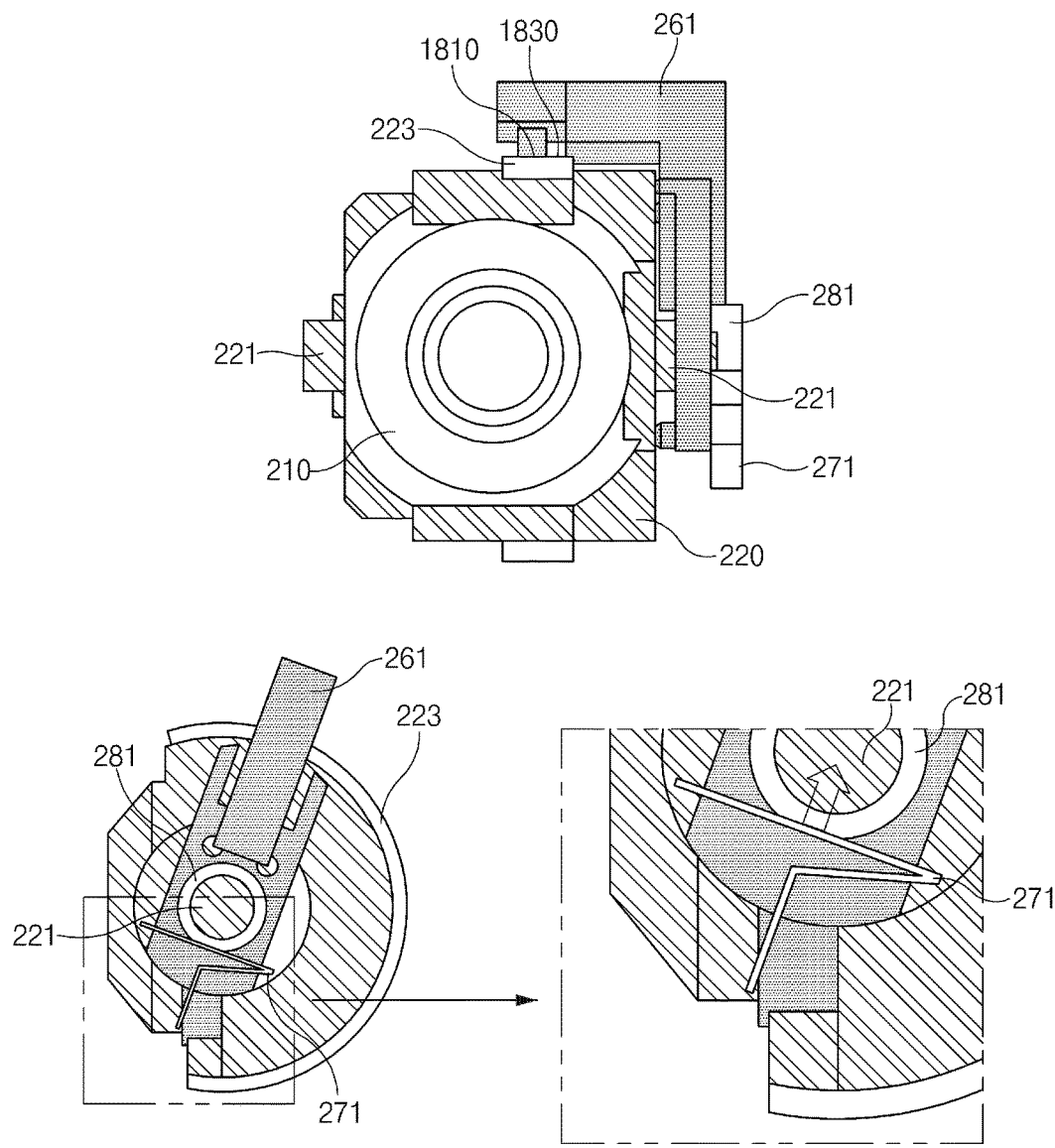
FIG. 18 illustrates a method of allowing a rotary member and an actuator to continuously contact each other by using an elastic member according to an embodiment of the present disclosure.

FIG. 18 illustrates a method of allowing a rotary member and an actuator to continuously contact each other by using an elastic member according to an embodiment of the present disclosure.

The upper part of FIG. 18 is a top view, and the lower part of FIG. 18 is a side view.

Referring to FIG. 18, the rotary member 220 may fix and support the lens barrel 210, and may be rotated by driving the actuator 261. The actuator 261 may be coupled to the rotary shaft 221 of the rotary member 220 to share a center of rotation with the rotary member 220, and may apply an external force in a tangential direction of the contact part 223 of the rotary member 220 to the contact part 223 of the rotary member 220.

A preliminary pressure applying member 271 may be used to force the driving part 1810 of the actuator 261 to continuously contact the contact part 223 of the rotary body 220. One end of the preliminary pressure applying member 271 may be fixed to a fixing member (e.g., the second rotary member 230) and an opposite end of the preliminary pressure applying member 271 may be connected to the constraint member 281 coupled to the rotary shaft 221 outside the actuator 261. The rotary member 220 may be moved in a lengthwise direction of the actuator 261 as a whole as the preliminary pressure applying member 271 pushes the constraint member 281 in the lengthwise direction of the actuator 261, and accordingly, the contact part 223 of the rotary member 220 may continuously contact the driving part 1810 of the actuator 261 on the contact surface 1830.

According to an embodiment of the present disclosure, the contact part 223 of the rotary member 220 and the driving part 1810 of the actuator 261 may minimize a change rate in a force transmission direction and maximize a change rate in a direction other than the force transmission direction. At least one of the contact part 223 of the rotary member 220 and the driving part 1810 of the actuator 261 may include a material with a friction coefficient greater than a specific value. The contact part 223 of the rotary member 220 may include a rubber material.

According to an embodiment of the present disclosure, an electronic device includes a housing including a first surface facing a first direction, a second surface facing a second direction that is opposite to the first direction, and a side surface surrounding at least a portion of a space formed between the first surface and the second surface, a display, a camera, a memory, and a processor functionally connected to the display, the camera, and the memory. The camera includes a lens barrel configured to fix and support at least one imaging element, a first rotary member configured to fix and support the lens barrel and including a first rotary shaft and a first contact part, a second rotary member configured to support the first rotary member and including a second rotary shaft and a second contact part, a frame configured to support the second rotary member, and a control circuit configured to control the camera. The first rotary member rotates about the first rotary shaft in a third direction by driving a first actuator, one end of the first actuator is coupled to the first rotary shaft and an opposite end of the first actuator contacts the first contact part, and the second rotary member rotates about the second rotary shaft in a fourth direction that is substantially perpendicular to the third direction by driving a second actuator, one end of the second actuator is coupled to the second rotary shaft and an opposite end of the second actuator contacts the second contact part.

According to an embodiment of the present disclosure, the first rotary shaft protrudes from a portion of an outer peripheral surface of the first rotary member to the outside of the first rotary member on a central axis of the first rotary member and be inserted into a hole formed on one side surface of the second rotary member.

According to an embodiment of the present disclosure, at least a portion of an outer peripheral surface of the first rotary member includes a curved surface, and the first contact part is formed in at least a portion of the curved surface.

According to an embodiment of the present disclosure, the second rotary shaft protrudes from a portion of an outer peripheral surface of the second rotary member to the outside of the second rotary member on a central axis of the second rotary member and be inserted into a hole formed on one side surface of the frame.

According to an embodiment of the present disclosure, at least a portion of an outer peripheral surface of the second rotary member includes a curved surface, and the second contact part be formed in at least a portion of the curved surface.

According to an embodiment of the present disclosure, the electronic device further includes a first constraint member coupled to the first rotary shaft outside of the first actuator while the first actuator is coupled to the first rotary shaft, and a second constraint member coupled to the second rotary shaft outside of the second actuator while the second actuator is coupled to the second rotary shaft.

According to an embodiment of the present disclosure, the electronic device further includes a first preliminary pressure applying member, one end of which is fixed to the second rotary member and an opposite end of which is connected to the first constraint member, the first preliminary pressure applying member being configured to apply an external force to the first constraint member towards the first contact part, and a second preliminary pressure applying member, one end of which is fixed to the frame and an opposite end of which is connected to the second constraint member, the second preliminary pressure applying member applying an external force to the second constraint member towards the second contact part. The opposite end of the first actuator continuously contacts the first contact part due to the external force of the first preliminary pressure applying member, and the opposite end of the second actuator continuously contacts the second contact part due to the external force of the second preliminary pressure applying member.

According to an embodiment of the present disclosure, at least one of the first preliminary pressure applying member and the second preliminary pressure applying member includes an elastic body.

According to an embodiment of the present disclosure, at least one of the first actuator and the second actuator includes two vibratory parts connected to each other in directions that are perpendicular to each other, and the vibratory parts vibrate in directions that are perpendicular to each other.

According to an embodiment of the present disclosure, the electronic device further includes a sensor module configured to detect rotational states of the first rotary member and the second rotary member.

According to an embodiment of the present disclosure, the sensor module includes a Hall sensor, and a magnetic body be disposed in the second rotary member.

According to an embodiment of the present disclosure, at least one of the first contact part and the second contact part includes a material with a friction coefficient greater than a specific value.

As described above, according to an embodiment of the present disclosure, a camera includes a lens barrel configured to fix and support at least one imaging element, a first rotary member configured to fix and support the lens barrel and including a first rotary shaft and a first contact part, a second rotary member configured to support the first rotary member and including a second rotary shaft and a second contact part, a frame configured to support the second rotary member, a first actuator, one end of the first actuator is coupled to the first rotary shaft and an opposite end of the first actuator contacts the first contact part, a second actuator, one end of the second actuator is coupled to the second rotary shaft and an opposite end of the second actuator contacts the second contact part, and a control circuit configured to control the camera. The first actuator rotates the first rotary member about the first rotary shaft in a first direction by applying an external force in a tangential direction of the first contact part, and the second actuator rotates the second rotary member about the second rotary shaft in a second direction that is substantially perpendicular to the first direction by applying an external force in a tangential direction of the second contact part.

According to an embodiment of the present disclosure, the camera further includes a first constraint member coupled to the first rotary shaft outside of the first actuator while the first actuator is coupled to the first rotary shaft, and a second constraint member coupled to the second rotary shaft outside of the second actuator while the second actuator is coupled to the second rotary shaft.

According to an embodiment of the present disclosure, the camera further includes a first preliminary pressure applying member, one end of which is fixed to the second rotary member and an opposite end of which is connected to the first constraint member such that the first preliminary pressure applying member applies an external force to the first constraint member towards the first contact part, and a second preliminary pressure applying member, one end of which is fixed to the frame and an opposite end of which is connected to the second constraint member such that the second preliminary pressure applying member applies an external force to the second constraint member towards the second contact part. The opposite end of the first actuator continuously contacts the first contact part due to the external force of the first preliminary pressure applying member, and the opposite end of the second actuator continuously contacts the second contact part due to the external force of the second preliminary pressure applying member.

According to an embodiment of the present disclosure, at least one of the first preliminary pressure applying member and the second preliminary pressure applying member includes an elastic body.

According to an embodiment of the present disclosure, the camera further includes a first preliminary pressure applying member, one end of which is fixed to the second rotary member and an opposite end of which is connected to the first actuator, the first preliminary pressure applying member being configured to apply an external pressure to the first actuator, and a second preliminary pressure applying member, one end of which is fixed to the frame and an opposite end of which is connected to the second actuator, the second preliminary pressure applying member being configured to apply an external force to the second actuator. The opposite end of the first actuator continuously contacts the first contact part due to the external force of the first preliminary pressure applying member, and the opposite end of the second actuator continuously contacts the second contact part due to the external force of the second preliminary pressure applying member.

According to an embodiment of the present disclosure, at least one of the first preliminary pressure applying member and the second preliminary pressure applying member includes an elastic body.

According to an embodiment of the present disclosure, the first actuator includes a coupling part coupled to the first rotary shaft, a first vibratory part connected to the coupling part and having a specific length in a lengthwise direction of the first actuator, the first vibratory part being configured to vibrate in a longitudinal direction of the first actuator, a second vibratory part extending from the first vibratory part by a specific length in a widthwise direction of the first actuator, the second vibratory part being configured to vibrate in the lengthwise direction of the first actuator, and a tip end part connected to the second vibratory part and formed at a tip end of the first actuator. The tip end part includes a driving part protruding from one surface of the tip end part by a specific length towards the coupling part and contacting the first contact part.

According to an embodiment of the present disclosure, the second actuator includes a coupling part coupled to the second rotary shaft, a first vibratory part connected to the coupling part and having a specific length in a lengthwise direction of the second actuator, the first vibratory part being configured to vibrate in a longitudinal direction of the second actuator, a second vibratory part extending from the first vibratory part by a specific length in a widthwise direction of the second actuator, the second vibratory part being configured to vibrate in the lengthwise direction of the second actuator, and a tip end part connected to the second vibratory part and formed at a tip end of the second actuator. The tip end part includes a driving part protruding from one surface of the tip end part by a specific length towards the coupling part and contacting the second contact part.

According to an embodiment of the present disclosure, because the actuator is connected to the rotary shaft of the rotary member, an assembly tolerance between the rotary member and the actuator is minimized.

Further, according to embodiment of the present disclosure, because the actuator continuously contacts the rotary member in a direction that is perpendicular to the contact surface of the rotary member, driving transmission efficiency is improved.

The term "module" as used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. The "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to an embodiment of the present disclosure may be implemented as instructions stored in a computer-readable storage medium in the form of a program module. In the case where the instructions are performed by a processor, the processor may perform functions corresponding to the instructions. The computer-readable storage medium may be, for example, a memory.

A computer-readable storage medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, and the like). The program instructions may include machine language codes generated by compilers and high-level language codes that may be executed by computers using interpreters. The above-mentioned hardware device may be configured to be operated as one or more software modules for performing operations of embodiments of the present disclosure and vice versa.

A module or a program module according to an embodiment of the present disclosure may include at least one of the above-mentioned elements, or some elements may be omitted or other additional elements may be added. Operations performed by the module, the program module or other elements may be performed in a sequential, parallel, iterative or heuristic way. Furthermore, some operations may be performed in another order or may be omitted, or other operations may be added.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and their equivalents.

What is claimed is:

1. An electronic device comprising:
   a housing including a first surface facing a first direction, a second surface facing a second direction that is opposite to the first direction, and a side surface surrounding at least a portion of a space formed between the first surface and the second surface;
   a display;
   a camera;
   a memory; and
   a processor functionally connected to the display, the camera, and the memory,
   wherein the camera includes:
   a lens barrel configured to fix and support at least one imaging element;
   a first rotary member configured to fix and support the lens barrel and including a first rotary shaft and a first contact part;
   a second rotary member configured to support the first rotary member and including a second rotary shaft and a second contact part;
   a frame configured to support the second rotary member; and
   a control circuit configured to control the camera,
   wherein the first rotary member rotates about the first rotary shaft in a third direction by driving a first actuator, one end of the first actuator coupled to the first rotary shaft and an opposite end of the first actuator contacting the first contact part, and
   the second rotary member rotates about the second rotary shaft in a fourth direction that is substantially perpendicular to the third direction by driving a second actuator, one end of the second actuator coupled to the second rotary shaft and an opposite end of the second actuator contacting the second contact part,
   wherein the camera further includes:
   a first constraint member coupled to the first rotary shaft outside of the first actuator while the first actuator is coupled to the first rotary shaft;
   a second constraint member coupled to the second rotary shaft outside of the second actuator while the second actuator is coupled to the second rotary shaft;
   a first preliminary pressure applying member, one end of which is fixed to the second rotary member and an opposite end of which is connected to the first constraint member, the first preliminary pressure applying member configured to apply an external force to the first constraint member towards the first contact part; and
   a second preliminary pressure applying member, one end of which is fixed to the frame and an opposite end of which is connected to the second constraint member, the second preliminary pressure applying member configured to apply an external force to the second constraint member towards the second contact part,
   wherein the opposite end of the first actuator continuously contacts the first contact part due to the external force from the first preliminary pressure applying member, and
   the opposite end of the second actuator continuously contacts the second contact part due to the external force from the second preliminary pressure applying member.

2. The electronic device of claim 1, wherein the first rotary shaft protrudes from a portion of an outer peripheral surface of the first rotary member to the outside of the first rotary member on a central axis of the first rotary member and is inserted into a hole formed on one side surface of the second rotary member.

3. The electronic device of claim 1, wherein at least a portion of an outer peripheral surface of the first rotary member includes a curved surface, and
the first contact part is formed in at least a portion of the curved surface.

4. The electronic device of claim 1, wherein the second rotary shaft protrudes from a portion of an outer peripheral surface of the second rotary member to the outside of the second rotary member on a central axis of the second rotary member and is inserted into a hole formed on one side surface of the frame.

5. The electronic device of claim 1, wherein at least a portion of an outer peripheral surface of the second rotary member includes a curved surface, and
the second contact part is formed in at least a portion of the curved surface.

6. The electronic device of claim 1, wherein at least one of the first preliminary pressure applying member and the second preliminary pressure applying member includes an elastic body.

7. The electronic device of claim 1, wherein at least one of the first actuator and the second actuator includes two vibratory parts connected to each other and disposed in directions that are perpendicular to each other, and the two vibratory parts vibrate in directions that are perpendicular to each other.

8. The electronic device of claim 1, further comprising a sensor module configured to detect rotational states of the first rotary member and the second rotary member.

9. The electronic device of claim 8, wherein the sensor module includes a Hall sensor, and
wherein a magnetic body is disposed in the second rotary member.

10. The electronic device of claim 1, wherein at least one of the first contact part and the second contact part includes a material with a friction coefficient greater than a specific value.

11. A camera comprising:
a lens barrel configured to fix and support at least one imaging element;
a first rotary member configured to fix and support the lens barrel and including a first rotary shaft and a first contact part;
a second rotary member configured to support the first rotary member and including a second rotary shaft and a second contact part;
a frame configured to support the second rotary member;
a first actuator, one end of the first actuator coupled to the first rotary shaft and an opposite end of the first actuator contacting the first contact part;
a second actuator, one end of the second actuator coupled to the second rotary shaft and an opposite end of the second actuator contacting the second contact part; and
a control circuit configured to control the camera,
wherein the first actuator rotates the first rotary member about the first rotary shaft in a first direction by applying an external force in a tangential direction of the first contact part, and
wherein the second actuator rotates the second rotary member about the second rotary shaft in a second direction that is substantially perpendicular to the first direction by applying an external force in a tangential direction of the second contact part,
wherein the camera further comprising:
a first constraint member coupled to the first rotary shaft outside of the first actuator while the first actuator is coupled to the first rotary shaft;
a second constraint member coupled to the second rotary shaft outside of the second actuator while the second actuator is coupled to the second rotary shaft;
a first preliminary pressure applying member, one end of which is fixed to the second rotary member and an opposite end of which is connected to the first constraint member such that the first preliminary pressure applying member applies an external force to the first constraint member towards the first contact part; and
a second preliminary pressure applying member, one end of which is fixed to the frame and an opposite end of which is connected to the second constraint member such that the second preliminary pressure applying member applies an external force to the second constraint member towards the second contact part,
wherein the opposite end of the first actuator continuously contacts the first contact part due to the external force of the first preliminary pressure applying member, and
wherein the opposite end of the second actuator continuously contacts the second contact part due to the external force of the second preliminary pressure applying member.

12. The camera of claim 11, wherein at least one of the first preliminary pressure applying member and the second preliminary pressure applying member includes an elastic body.

13. The camera of claim 11, wherein the first actuator includes:
a coupling part coupled to the first rotary shaft;
a first vibratory part connected to the coupling part and having a specific length in a lengthwise direction of the first actuator, the first vibratory part configured to vibrate in a longitudinal direction of the first actuator;
a second vibratory part extending from the first vibratory part by a specific length in a widthwise direction of the first actuator, the second vibratory part configured to vibrate in the lengthwise direction of the first actuator; and
a tip end part connected to the second vibratory part and formed at a tip end of the first actuator, and
wherein the tip end part includes a driving part protruding from one surface of the tip end part by a specific length towards the coupling part and contacting the first contact part.

14. The camera of claim 11, wherein the second actuator includes:
a coupling part coupled to the second rotary shaft;
a first vibratory part connected to the coupling part and having a specific length in a lengthwise direction of the second actuator, the first vibratory part configured to vibrate in a longitudinal direction of the second actuator;
a second vibratory part extending from the first vibratory part by a specific length in a widthwise direction of the second actuator, the second vibratory part configured to vibrate in the lengthwise direction of the second actuator; and
a tip end part connected to the second vibratory part and formed at a tip end of the second actuator, and
wherein the tip end part includes a driving part protruding from one surface of the tip end part by a specific length towards the coupling part and contacting the second contact part.

* * * * *